(12) United States Patent
Ghoniem et al.

(10) Patent No.: US 10,774,720 B2
(45) Date of Patent: Sep. 15, 2020

(54) NOX REDUCTION WITHOUT UREA USING A DUAL STAGE CATALYST SYSTEM WITH INTERCOOLING IN VEHICLE GASOLINE ENGINES

(71) Applicant: Tecogen, Inc., Waltham, MA (US)

(72) Inventors: Ahmed F. Ghoniem, Winchester, MA (US); Jean Roy, Middleton, MA (US)

(73) Assignee: Tecogen, Inc., Waltham, MA (US)

( * ) Notice: Subject to any disclaimer, the term of this patent is extended or adjusted under 35 U.S.C. 154(b) by 129 days.

(21) Appl. No.: 15/800,357

(22) Filed: Nov. 1, 2017

(65) Prior Publication Data

US 2018/0230882 A1  Aug. 16, 2018

Related U.S. Application Data

(63) Continuation-in-part of application No. 15/496,828, filed on Apr. 25, 2017.

(Continued)

(51) Int. Cl.
*F01N 3/02* (2006.01)
*F01N 3/10* (2006.01)
(Continued)

(52) U.S. Cl.
CPC ............. *F01N 3/30* (2013.01); *F01N 3/02* (2013.01); *F01N 3/021* (2013.01); *F01N 3/0205* (2013.01);
(Continued)

(58) Field of Classification Search
CPC ........ F01N 3/0205; F01N 3/021; F01N 3/035; F01N 3/05; F01N 3/101; F01N 3/103;
(Continued)

(56) References Cited

U.S. PATENT DOCUMENTS

| 5,894,834 A | 4/1999 | Kim |
| 6,343,572 B1 | 2/2002 | Pfaff et al. |

(Continued)

FOREIGN PATENT DOCUMENTS

| WO | 1999012642 A1 | 3/1999 |
| WO | WO1999012642 A1 | 3/1999 |

OTHER PUBLICATIONS

ISA, "International Search Report", PCT/US2017/029423, dated Sep. 15, 2017.
(Continued)

*Primary Examiner* — Thai Ba Trieu
*Assistant Examiner* — Dapinder Singh
(74) *Attorney, Agent, or Firm* — Intrinsic Law Corp.

(57) ABSTRACT

An exhaust aftertreatment system includes a first catalytic converter, an oxidation catalyst including a storage catalyst, an air injector, and a cooling unit. The exhaust aftertreatment system is fluidly coupled to an output of a spark-ignited internal combustion engine that operates in the rich regime during acceleration and the lean regime during deceleration. In one aspect, the storage catalyst stores ammonia produced while the engine operates in the rich regime. The stored ammonia reacts with nitrogen oxide compounds produced when the engine operates in the lean regime. In another aspect, the nitrogen oxide compounds react with ammonia produced while the engine operates in the rich regime.

16 Claims, 20 Drawing Sheets

Related U.S. Application Data

(60) Provisional application No. 62/457,846, filed on Feb. 11, 2017.

(51) Int. Cl.

| | |
|---|---|
| *F01N 3/20* | (2006.01) |
| *F01N 3/30* | (2006.01) |
| *F01N 9/00* | (2006.01) |
| *F01N 3/04* | (2006.01) |
| *F01N 3/22* | (2006.01) |
| *F01N 3/32* | (2006.01) |
| *F01N 3/021* | (2006.01) |
| *F01N 3/035* | (2006.01) |

(52) U.S. Cl.
CPC ............. *F01N 3/043* (2013.01); *F01N 3/106* (2013.01); *F01N 3/225* (2013.01); *F01N 3/32* (2013.01); *F01N 9/002* (2013.01); *F01N 3/035* (2013.01); *F01N 3/101* (2013.01); *F01N 2240/02* (2013.01); *F01N 2240/22* (2013.01); *F01N 2560/025* (2013.01); *F01N 2560/06* (2013.01); *F01N 2900/1404* (2013.01); *Y02A 50/2324* (2018.01); *Y02T 10/22* (2013.01); *Y02T 10/47* (2013.01)

(58) Field of Classification Search
CPC .......... F01N 3/225; F01N 3/30; F01N 13/009; F01N 13/0093; F01N 13/0097; F01N 11/007; F01N 2240/02; F01N 2250/02; F01N 2250/10; F01N 2270/10; F01N 2560/025; F01N 2900/0422; F01N 2900/1402; F01N 2900/1404; F02B 37/16; F02B 37/164; F02B 37/168
USPC ................. 60/274, 276, 277, 280, 289, 295, 60/297–301, 307, 311, 320
See application file for complete search history.

(56) References Cited

U.S. PATENT DOCUMENTS

| | | | | |
|---|---|---|---|---|
| 6,568,179 | B2 * | 5/2003 | Deeba | F01N 3/0814 60/298 |
| 6,871,489 | B2 * | 3/2005 | Tumati | F01N 13/0097 60/274 |
| 7,246,487 | B2 * | 7/2007 | Hara | B60H 1/025 60/285 |
| 2006/0021332 | A1 | 2/2006 | Gaiser | |
| 2006/0130469 | A1 | 6/2006 | Baeuerle et al. | |
| 2008/0134648 | A1 | 6/2008 | Duvinags et al. | |
| 2009/0217649 | A1 | 9/2009 | Bremser et al. | |
| 2009/0266063 | A1 | 10/2009 | Gandhi | |
| 2010/0043413 | A1 | 2/2010 | Orihashi et al. | |
| 2011/0126517 | A1 * | 6/2011 | Miyoshi | F01N 3/2066 60/274 |
| 2011/0138807 | A1 | 6/2011 | Ulrey et al. | |
| 2011/0139131 | A1 | 6/2011 | Kardos | |
| 2011/0265451 | A1 | 11/2011 | Gehret et al. | |
| 2012/0090295 | A1 | 4/2012 | Yacoub | |
| 2012/0124995 | A1 | 5/2012 | Springer et al. | |
| 2012/0167553 | A1 | 7/2012 | Qi et al. | |
| 2013/0312407 | A1 | 11/2013 | Sumilla et al. | |
| 2014/0026543 | A1 | 1/2014 | Danckert et al. | |
| 2014/0041367 | A1 | 2/2014 | Balthes et al. | |
| 2014/0060013 | A1 | 3/2014 | Dunn | |
| 2014/0230410 | A1 | 8/2014 | Yacoub | |
| 2015/0013328 | A1 | 1/2015 | Carstensen et al. | |
| 2016/0076419 | A1 | 3/2016 | Roy et al. | |
| 2016/0279572 | A1 | 9/2016 | Roy et al. | |

OTHER PUBLICATIONS

ISA, "International Search Report", PCT/US2017/043711, dated Oct. 5, 2017.

ISA, "International Search Report", PCT/US2017/059488, dated Jan. 25, 2018.

\* cited by examiner

NOX REDUCTION WITHOUT UREA USING A DUAL STAGE CATALYST SYSTEM WITH INTERCOOLING IN VEHICLE GASOLINE ENGINES

RELATED APPLICATIONS

This application is related to U.S. patent application Ser. No. 15/658,998, titled "Dual Stage Internal Combustion Engine Aftertreatment System Using Common Radiator Cooling Fluid Circuits for Exhaust Gas Intercooling and Charger-Driven Ejector," filed on Jul. 25, 2017, which is a continuation-in-part of U.S. patent application Ser. No. 15/496,828, titled "Dual Stage Internal Combustion Engine Aftertreatment System Using Exhaust Gas Intercooling and Charger Driven Air Ejector," filed on Apr. 25, 2017, which claims priority to U.S. Provisional Application No. 62/457,846, titled "Assemblies and Methods for Reducing Particulate Matter, Hydrocarbons, and Gaseous Oxides from Internal Combustion Engine Exhaust," filed on Feb. 11, 2017, the disclosures of which are hereby incorporated by reference.

TECHNICAL FIELD

The present application relates generally to emissions control systems for internal-combustion engines.

BACKGROUND

Vehicle emissions are highly regulated to minimize the output of environmentally-harmful exhaust emissions. The major regulated pollutants include carbon monoxide (CO), nitrogen oxide compounds ($NO_x$), and unburned hydrocarbons ($C_xH_y$). If the vehicle exhaust is left untreated, the levels of pollutants would far exceed the emissions standards set by, for example, the U.S. Environmental Protection Agency, the states, or another country.

To meet these standards, vehicles include exhaust aftertreatment systems that include catalytic converters, such as three-way catalytic (TWC) converters, to convert gaseous CO, $NO_x$, and $C_xH_y$ into less harmful compounds through oxidation and reduction reactions. An example of such an exhaust aftertreatment system is illustrated in FIG. 1, which is a block diagram of an underbody of a vehicle 10. The vehicle 10 includes engine 100, first catalytic converter 110, second catalytic converter 120, and muffler 130, which are in fluid communication with one another through pipe or conduit 140. In operation, the engine 100 generates exhaust, which travels through conduit 140 to first catalytic converter 110, second catalytic converter 120, muffler 130, and then into the environment through tail pipe 150.

Recently, emissions regulators have become increasingly concerned about particulate emissions and setting limits on their levels in engine exhausts both in terms of their total mass (PM) and number (PN). These particulates are generated inside internal combustion engines in three basic forms: (1) condensables (also referred to as PM2.5 when their size is less than 2.5 microns), (2) pure solids, generally referred to as "black carbon," and (3) carbon particles saturated with volatile hydrocarbon condensables, generally referred to as semi volatile particles or "brown carbon." At the high temperatures typical inside a standard exhaust aftertreatment system, such as that illustrated in FIG. 1, some of these particulates form into liquid-phase and solid-phase particulates before the exhaust gases reach the tailpipe, while some of the volatile hydrocarbon condensables remain in their gaseous phase. After exiting the tailpipe, volatile hydrocarbon condensables cool and return to the liquid phase, appearing as an aerosol. The final state of the condensables depends on the temperature, degree of dilution, other particulates in the atmosphere, etc.

Gasoline particulate filters (GPFs) and catalyzed gasoline particulate filters (cGPFs), coupled in some form to a catalytic converter, have been proposed for removing particulates from hot exhaust gases before they exit the tailpipe. However, GPFs and cGPFs cannot remove volatile hydrocarbon condensables in their gaseous form. In addition to exiting the exhaust system as a liquid (e.g., as an aerosol), gaseous volatile hydrocarbon condensables can form additional particulates downstream of the GPF/cGPF, for example in the muffler or as they exit the tail pipe.

An additional problem with existing exhaust aftertreatment systems that employ multiple catalysts is that the high operating temperatures of the second catalytic converter 120 may cause $NO_x$ to reform, which is undesirable and, in some instances, prevents the vehicle from complying with emissions regulations.

Installation of multiple heat exchangers (for example, radiators) to cool multiple heat loads in an internal combustion system is costly and can require precious space in tight quarters, especially in motor vehicle applications.

An additional problem with existing exhaust aftertreatment systems is that they do not treat ammonia which forms during rich-burn operation of the engine. It would also be desirable to further reduce $NO_x$ emissions.

It would be desirable to overcome one or more of the foregoing problems.

SUMMARY

Example embodiments described herein have innovative features, no single one of which is indispensable or solely responsible for their desirable attributes. The following description and drawings set forth certain illustrative implementations of the technology in detail, which are indicative of several exemplary ways in which the various principles of the technology may be carried out. The illustrative examples, however, are not exhaustive of the many possible embodiments of the technology. Without limiting the scope of the claims, some of the advantageous features will now be summarized. Other objects, advantages and novel features of the technology will be set forth in the following detailed description when considered in conjunction with the drawings, which are intended to illustrate, not limit, the disclosure.

An aspect of the technology is directed to a system comprising: a first catalytic converter including a three-way catalyst, the first catalytic converter receiving an exhaust generated by a spark-ignited internal combustion engine in a vehicle; an oxidation catalyst comprising a storage catalyst, the oxidation catalyst in fluid communication with an output of the first catalytic converter; an exhaust conduit extending from the first catalytic converter to the oxidation catalyst; an air injector in fluid communication with the exhaust conduit; and an exhaust gas intercooler in thermal communication with the exhaust in the exhaust conduit, the exhaust gas intercooler configured to lower a temperature of the exhaust to about 350° F. to about 500° F.

In one or more embodiments, the system further comprises a radiator; an EGI radiator cooling fluid circuit in thermal communication with said exhaust gas intercooler and said radiator; and an engine radiator cooling fluid circuit in thermal communication with said engine and said radiator, wherein said engine radiator cooling fluid circuit is fluidically in parallel with said EGI radiator cooling fluid circuit. In one or more embodiments, EGI radiator cooling fluid circuit and said engine radiator cooling fluid circuit share a common radiator cooling fluid path that extends through a common radiator coil in said radiator.

In one or more embodiments, said oxidation catalyst comprises at least one of the following: Pt, Ir, Rh, or Pd. In one or more embodiments, said storage catalyst comprises at least one of a zeolite, vanadium or a titanium oxide carrier.

In one or more embodiments, the system further comprises a gas particulate filter coupled to said exhaust conduit or said oxidation catalyst. In one or more embodiments, said gas particulate filter and said oxidation catalyst are integrated as a catalyzed gas particulate filter. In one or more embodiments, said air injector comprises an engine charger compressor.

In one or more embodiments, the system further comprises a compressed air conduit extending from said engine charger compressor to an intake of said engine; and an air ejection conduit extending from (a) said engine charger compressor or (b) said compressed air conduit to (c) said exhaust conduit, whereby said air ejection conduit introduces a stream of compressed air into said exhaust conduit. In one or more embodiments, the system further comprises an oxygen sensor disposed in said exhaust conduit between (a) an inlet port for said compressed air conduit and (b) said oxidation catalyst, the oxygen sensor outputting an oxygen content of said exhaust to a controller. In one or more embodiments, said controller is configured to adjust said operating position of a flow control valve disposed in the air ejection conduit such that said oxygen content is at least about 0.1% by volume. In one or more embodiments, the exhaust gas intercooler is configured to lower the temperature of the exhaust to about 400° F.

Another aspect of the technology is directed to a method for reducing emissions from a spark-ignited internal combustion engine. The method comprises, when said engine operates with a rich air-fuel ratio (AFR): passing a rich exhaust generated by said engine with said rich AFR through a first stage catalytic converter; with said rich exhaust, generating ammonia in the first stage catalytic converter; cooling the rich exhaust, including the ammonia, in an exhaust gas intercooler to about 350° F. to about 500° F. to form cooled rich exhaust; passing the cooled rich exhaust through an oxidation catalyst comprising a storage catalyst; and storing at least some of the ammonia in the storage catalyst. The method further comprises, when said engine operates with a lean AFR: passing a lean exhaust generated by said engine with said lean AFR through said first stage catalytic converter; cooling the lean exhaust in said exhaust gas intercooler to about 350° F. to about 500° F. to form a cooled lean exhaust; passing the cooled lean exhaust through the oxidation catalyst; and reacting nitrogen oxide compounds in the cooled lean exhaust with the ammonia stored in the storage catalyst, thereby reducing a concentration of the ammonia and nitrogen oxide compounds in the rich and lean exhausts.

In one or more embodiments, the method further comprises when said engine operates with said rich AFR, reacting at least some of the ammonia with the nitrogen oxide compounds, slipped by the first stage catalyst, in the second stage catalyst with air injection. In one or more embodiments, the method further comprises increasing an oxygen content of the cooled rich exhaust to at least about 0.1% by volume. In one or more embodiments, the rich and lean exhausts are cooled to about 400° F.

IN THE DRAWINGS

For a fuller understanding of the nature and advantages of the present technology, reference is made to the following detailed description of preferred embodiments and in connection with the accompanying drawings, where like reference numbers where to like elements.

DETAILED DESCRIPTION

Figure 1:
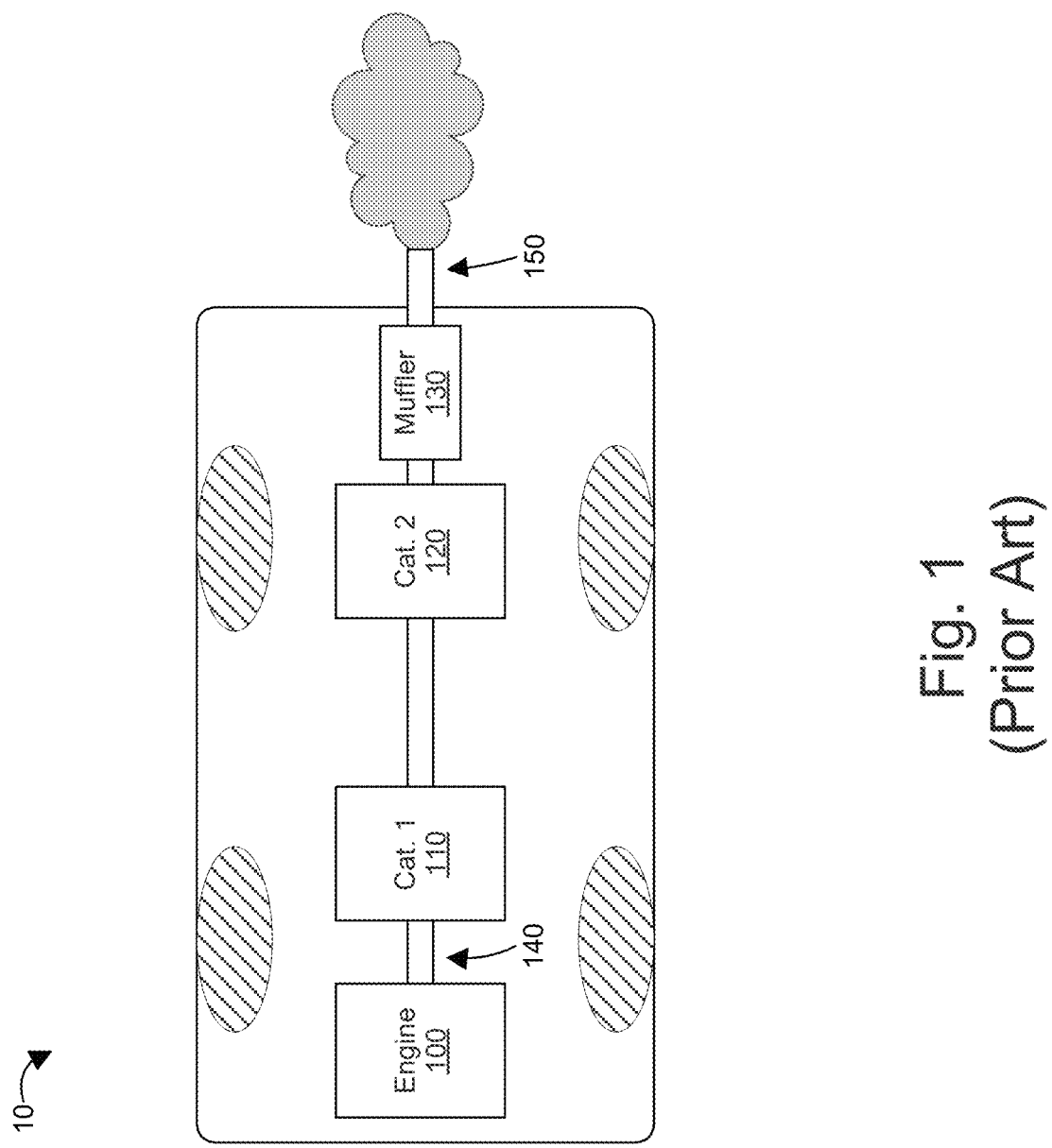
FIG. 1 is a block diagram of an underbody of a vehicle according to the prior art.

An exhaust aftertreatment system includes a first stage catalytic converter, a second stage catalytic converter, and a conduit extending from the first stage catalytic converter to the second stage catalytic converter. The conduit passes through an exhaust gas intercooler that reduces the temperature of the exhaust to 300° F. to 500° F. Air is ejected into the exhaust conduit to increase the oxygen concentration in the exhaust before it passes through the second stage catalytic converter. The air can be ejected from an air injection conduit that extends to a vehicle charger compressor or to a compressed air conduit that extends from the charger compressor to the engine. For example, as will be described below, air from a compressor driven by an engine forced induction or charger system (e.g., turbo charger and/or supercharger) can be used as a feed-forward air supply to a downstream portion of the vehicle's exhaust components. A gas particulate filter can be disposed in the exhaust conduit or it can be integrated with the second stage catalytic converter, for example as a catalyzed gas particulate filter.

The exhaust aftertreatment system includes an exhaust gas intercooler (EGI) disposed between a first stage catalytic converter and a second stage catalytic converter. The exhaust gas intercooler reduces the temperature of the exhaust to about 400° F., such as about 300° F. to about 500° F., or about 350° F. to about 450° F. Reducing the temperature of the exhausts causes gaseous condensables (e.g., volatile unburned hydrocarbons) to undergo a phase change and condense as liquids or solids, which can be collected by a gas particulate filter to reduce vehicle emissions. The gas particulate filter can be disposed between the exhaust gas intercooler and the second stage catalytic converter, or it can be integrated with the second stage catalytic converter, for example as a catalyzed gas particulate filter. The EGI can be cooled by radiator cooling fluid provided in a fluid circuit that passes through the EGI and a radiator. In some embodiments, parallel radiator cooling fluid circuits are provided including an engine cooling circuit and an EGI circuit. The parallel radiator cooling fluid circuits share the same radiator. For example, the parallel radiator cooling fluid circuits can share the same radiator coil in the radiator or each fluid circuit can flow through a respective radiator coil in the radiator.

A stream of air is ejected into the exhaust stream in an exhaust conduit that extends from the exhaust gas intercooler to the second stage catalytic converter to increase the oxygen concentration in the exhaust before it enters the second stage catalytic converter to promote oxidation reactions therein. The stream of air can be ejected from an air injection conduit, forming an air-driven exhaust gas ejector (EGE), that extends to and/or includes a dedicated air compressor or to an engine charger compressor. Alternatively, the air injection conduit extends to a compressed air conduit that extends between the engine charger compressor and the intake of the engine. The engine charger compressor can be a turbocharger compressor or a supercharger compressor for the engine. The introduction or injection of compressed air into the exhaust stream leaving the exhaust gas intercooler can enhance the flow rate of exhaust through the exhaust conduit and out the tailpipe, which promotes the overall flow of exhaust from engine and manages the pressure distribution in the exhaust system between the air-driven exhaust gas ejector EGE and near the exhaust valve, thereby improving engine efficiency/gas mileage and/or performance.

The pressure drop in the exhaust system is a source of loss and reducing this pressure drop by introducing compressed air downstream of the heat exchanger has overall beneficial impact on the efficiency of the engine, besides its role in the second stage oxidation catalyst. There is yet another benefit to introducing the compressed air in the exhaust system. It is known that raising the pressure during the exhaust process because of the pressure change in the exhaust system can be used to manage the gas expansion inside the engine cylinders following combustion and hence can lead to losses. However, it is also true that slight increase in the back pressure after the exhaust valve during the exhaust process can increase the local exhaust gas recirculation back into the engine cylinders, or the amount of exhaust gas that is retained in the engine cylinders. This reduces the likelihood of knocking and makes it possible to tune the engine for higher efficiency with advanced spark operation. Therefore, the compressed air injection before the second catalyst has two benefits: reducing the back pressure to minimize its impact on the overall efficiency while maintaining sufficient back pressure to gain the benefit of reduction in the engine combustion temperature and reducing the potential for knock.

A controller can control the temperature of the exhaust gas that exits the EGI or that enters the second stage catalytic converter. For example, the controller can control the volume or flow rate of the radiator cooling fluid that passes through the EGI (e.g., through the EGI radiator cooling fluid circuit) to adjust the temperature measured by a thermocouple downstream of the EGI (e.g., at the EGI exit or between the air injection inlet and the second stage catalytic converter). For example, increasing the volume or flow rate of radiator cooling fluid through the EGI causes the temperature of the exhaust gas to decrease. In contrast, decreasing the volume or flow rate of radiator cooling fluid through the EGI causes the temperature of the exhaust gas to increase. In addition or in the alternative, the controller can adjust a bypass valve in the EGI that controls the amount of exhaust gas that bypasses the EGI cooling. The bypassed and cooled exhaust gas are recombined and resultant temperature is dependent on the ratio and respective temperatures of the bypassed and cooled exhaust gases.

Figure 2:
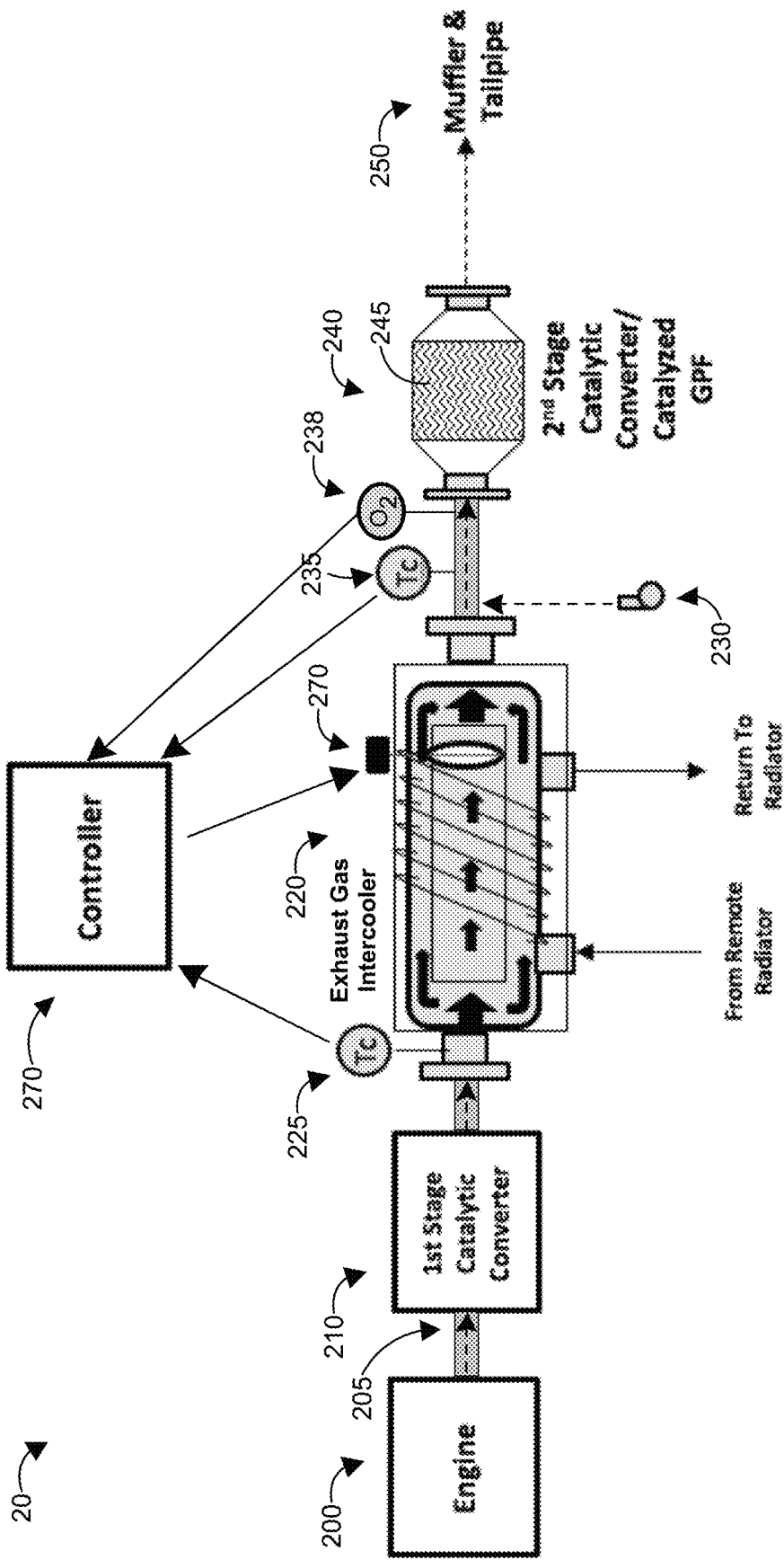
FIG. 2 is a block diagram of an exhaust aftertreatment system according to one or more embodiments.

FIG. 2 is a block diagram of an exhaust aftertreatment system 20 according to one or more embodiments. The system 20 includes a first stage catalytic converter 210, an exhaust gas intercooler (EGI) 220, a compressor 230, a second stage catalytic converter/cGPF 240, a muffler and tailpipe 250, and a controller 260. Exhaust from an internal combustion engine 200 enters an exhaust conduit 205 that extends from engine 200 to the muffler and tail pipe 250, through the first stage catalytic converter 201, EGI 220, and the second stage catalytic converter/cGPF 240. The exhaust conduit 205 can be connected to each cylinder of the engine 200 via a manifold. The exhaust enters the first stage catalytic converter 200 at or near the operating temperature of the engine at the end of the exhaust stroke. At steady state (i.e., after the engine has warmed up from a cold start), the exhaust from engine 200 reaches the exhaust system 20 in the range of about 850° F. to about 1250° F. As used herein, "about" means plus or minus 10% of the relevant value. Engine 200 can be a spark-ignited internal combustion engine running on gasoline, natural gas, renewable fuels, a combination of any or all of these fuels, or a diesel engine. In addition, engine 200 can be in a vehicle (e.g., a passenger car, a truck, a forklift, or other vehicle) or it can be stationary, for example to drive a combined heat and power (CHP) system.

The engine 200 can operate with an air-fuel ratio (AFR) in the rich burn regime (i.e., greater than or equal to the stoichiometric AFR), or in the lean burn regime (i.e., less than the stoichiometric AFR). In some embodiments, the stoichiometric AFR is 14.64:1 (by mass) for gasoline. The stoichiometric AFR can vary depending on the type of fuel. For example, the stoichiometric AFR can be lower if the fuel includes ethanol. As an example, E85 fuel (85% ethanol, 15% gasoline) can have a stoichiometric AFR of about 9.8:1. When the engine 200 operates in the rich burn regime, the exhaust contains a minimal or a substantially zero oxygen content. For example, the oxygen content can be less than or equal to about 0.1% by volume, less than or equal to about 0.05% by volume, and/or less than or equal to about 0.025% by volume.

The first stage catalytic converter 210 includes a catalyst comprising one or more platinum group metals (PGMs), such as Pt, Pd, and/or Rh. In some embodiments, the first stage catalytic converter 210 includes a TWC. The first stage catalytic converter 210 promotes chemical reactions (e.g., reduction reactions) that remove $NO_x$ compounds from the exhaust stream (e.g., by reducing $NO_x$ to form $N_2$ and $O_2$). The first stage catalytic converter 210 can also promote chemical reactions that reduce the concentration of CO and $C_xH_y$ compounds from the exhaust stream. For example, the first stage catalytic converter 210 can promote the oxidation of CO and the complete or partial oxidation of $C_xH_y$ compounds. In some embodiments, the second stage catalytic converter 240 can itself have more than one section that in some designs promote the formation and storage or other gases such as ammonia or $NO_x$. In some designs this section can perform the function of a selective catalytic reactor (SCR).

After passing through the first stage catalytic converter 210, the exhaust flows into EGI 220 which lowers the temperature of the exhaust to an output temperature $T_{mix}$ of about 400° F., such as about 300° F. to about 500° F. or about 350° F. to about 450° F. In some embodiments, EGI 220 lowers the temperature of the exhaust to an output temperature $T_{mix}$ of about 300° F., about 325° F., about 350° F., about 375° F., about 400° F., about 425° F., about 450° F., about 475° F., about 500° F., or any value or range between any two of the foregoing values. The exhaust gas intercooler 220 can be a heat exchanger or other cooling device, which receives radiator cooling fluid from a radiator. Examples of the fluid circuits through which the radiator cooling fluid can flow are illustrated in FIGS. 12 and 14-16. EGI 220 includes a cooled path in which EGI 220 cools the exhaust and an optional bypass path that is not cooled by EGI 220. The cooled and optional bypass paths of the heat exchanger converge at the downstream end of the heat exchanger, where the paths mix and have the temperature $T_{mix}$. The exhaust that flows through the cooled path can be cooled to a temperature of about 250° F. to about 350° F., including about 275° F., about 300° F., about 325° F., or any value or range between any two of the foregoing values. EGI 220 cools the exhaust with a cooling fluid, such as radiator fluid or other coolant, which is in thermal communication with the exhaust that flows through the cooled path. For example, the cooling fluid can be received from the vehicle's radiator and pass through a coil that provides a surface area for thermal communication between the cooling fluid and the exhaust flowing through the cooled path.

The temperature $T_{mix}$ can be adjusted by varying the flow rates of the exhaust in each path. For example, EGI 220 can include a bypass valve 270 that can be adjusted to vary the flow rate of the exhaust in the bypass path. When the bypass valve 270 is closed, all of the exhaust flows through the cooled path. When the bypass valve 270 is open, the exhaust flows through both the cooled and bypass paths without restriction. The bypass valve can also be partially opened or closed to allow some exhaust to flow through the bypass path. In some embodiments, EGI 220 can also include a cooled path valve to open or close the cooled path. For example, during cold start the cooled path valve can be fully closed while the bypass valve 270 is fully open so the exhaust is at a maximum temperature when it passes through the second stage catalytic converter 240 to promote the chemical reactions at the second stage catalytic converter 240. Alternatively, EGI 220 can include a valve at its upstream side to direct the exhaust to either the cooled or bypass path, or to both the cooled and bypass paths. Any of the foregoing valves can be adjusted by controller 260, which receives as inputs a first temperature of the exhaust before it enters EGI 220, measured by thermocouple 225, and a second temperature of the exhaust after it exits EGI 220, measured by thermocouple 235. The controller 260 adjusts the valve(s) (e.g., valve 270) so that the second temperature (e.g., $T_{mix}$) is at a set point temperature of about 400° F., such as about 300° F. to about 500° F., as discussed above. The controller 260 can also adjust the flow rate of coolant in EGI 210 to adjust the second temperature (e.g., $T_{mix}$).

After the exhaust gas exits EGI 220, the exhaust in exhaust conduit 205 receives a stream of air ejected by compressor 230. The ejected air increases the oxygen concentration in the exhaust before it passes through the second stage catalytic converter 240. The increased oxygen concentration promotes oxidation reactions in the second stage catalytic converter 240 that remove carbon monoxide and unburned hydrocarbons from the exhaust. The compressor 230 can eject unheated air taken from outside of the vehicle, which can have a temperature in the range of about 32° F. (or lower in the winter) to about 90° F. (or higher in the summer), depending on the climate in which the vehicle is located. The unheated air can cause the temperature of the exhaust to decrease. In other embodiments, the ejected air is preheated in which case it has little effect on the exhaust temperature. To control for the temperature change caused by the ejected air, thermocouple 235 is preferably located downstream of the ejected air inlet to provide the appropriate feedback temperature to controller 260. Depending on the temperature of the ejected air, its introduction into the exhaust stream can lead to further condensation of volatile gaseous hydrocarbons and/or growth of existing semi volatile brown or black carbon compounds.

Compressor 230 can be a dedicated air compressor or can be a shared compressor used by other components of the vehicle. In some embodiments, compressor 230 can be a turbocharger compressor and/or a supercharger compressor associated with engine 200. For example, compressor 230 can be a turbine-driven compressor used to turbocharge engine 200 (e.g., coupled to a turbine in exhaust conduit 205). In another example, compressor 230 can be a mechanically-driven or an electrically-driven compressor (e.g., an e-compressor) used to supercharge engine 200. In some embodiments, engine 200 includes both a turbocharger compressor and a supercharger compressor.

An oxygen sensor 238 is disposed in the exhaust conduit 205 to measure the oxygen concentration of the exhaust after air injection through the exhaust gas ejector EGE. The measured oxygen concentration is sent from oxygen sensor 238 to controller 270, which compares the measured oxygen concentration to a target oxygen concentration or a target oxygen concentration range. When the measured oxygen concentration is above or below the target oxygen concentration or the target oxygen concentration range, controller 270 sends a control signal to adjust the flow rate of ejected air from compressor 230. The flow rate of ejected air can be modified by adjusting the operating conditions of compressor 230 (e.g., pressure) and/or by adjusting a valve in fluid communication with compressor 230 (e.g., as described below). For example, when the measured oxygen concentration is below the target oxygen concentration or target oxygen concentration range, controller 270 sends a control signal to increase the flow rate of ejected air from compressor 230. In another example, when the measured oxygen concentration is above the target oxygen concentration or the target oxygen concentration range, controller 270 sends a control signal to decrease the flow rate of ejected air from compressor 230. The target oxygen concentration can be at least about 0.1% by volume, such as at least about 0.25% by volume, at least about 0.5% by volume, at least about 0.75% by volume, at least about 1% by volume, or a higher concentration. Likewise, the target oxygen concentration range can be about 0.1% by volume to at least about 1% by volume, or any range or value there between.

After receiving the ejected air from compressor 230, the exhaust passes into the second stage catalytic converter 240. The second stage catalytic converter 240 promotes chemical reactions (e.g., oxidation reactions) that remove carbon monoxide and unburned hydrocarbons (e.g., by oxidizing CO to for $CO_2$ and by oxidizing $C_xH_y$ to form $CO_2$ and $H_2O$) from the exhaust stream. At the reduced temperature that the exhaust enters the second stage catalytic converter 240 (i.e., $T_{mix}$ of about 400° F., such as about 350° F. to about 450° F.), the oxidation reactions occur without reforming nitrogen oxide compounds, which are controlled by emissions regulators. In some embodiments, the second stage catalytic converter 240 can also reduce the concentration of any remaining $NO_x$ in the exhaust. The second stage catalytic converter 240 can include a catalyst comprising one or more PGMs, such as Pt, Pd, and/or Rh. In some embodiments, the second stage catalytic converter 240 includes a TWC. In some embodiments, the second stage catalytic converter 240 can include an oxygen storage catalyst, such as Ce and/or Zr. In can also be or include an SCR, such as an SCR that is Zeolite based. Catalyst compositions similar to what is used in diesel aftertreatment systems that utilize urea injection can also be used because they have the added advantage of storing $NO_x$ during part of the cycle and hence can achieve overall higher $NO_x$ reduction. The later would be possible without urea injection in the technology described herein since ammonia is naturally produced and stored during other parts of the drive cycle.

Figure 3:
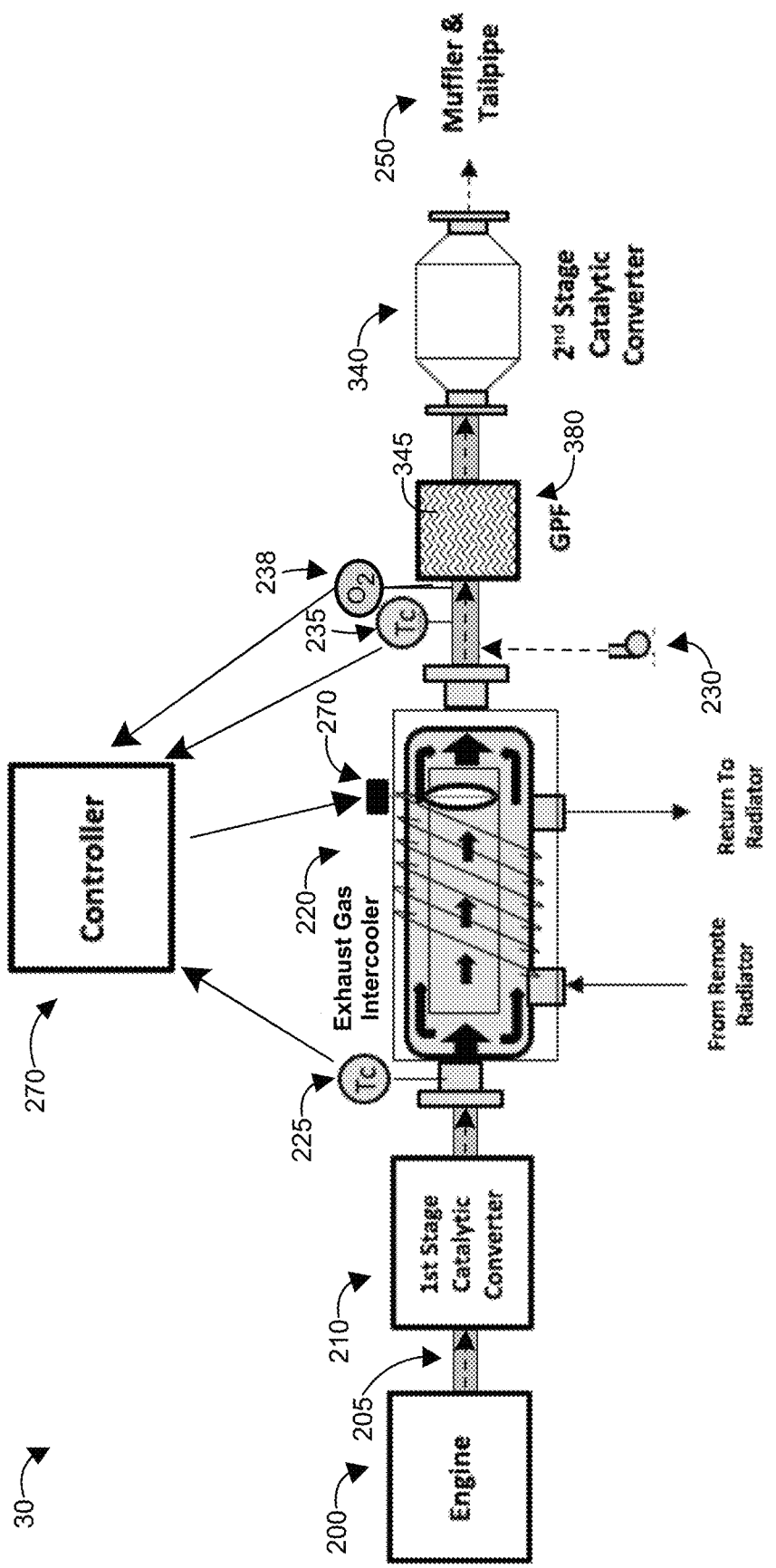
FIG. 3 illustrates an exhaust aftertreatment system according to one or more embodiments.

The second stage catalytic converter 240 also includes a GPF. The GPF can be a separate unit (e.g., a modular portion) of the second stage catalytic converter 240 or it can be integrated into the second stage catalytic converter 240. In some embodiments, the second stage catalytic converter is a cGPF, which can include some or all catalytic elements that are also disposed in the second stage catalytic converter 240. For example, the cGPF can include one or more of the above-described platinum-group metals, an oxygen storage catalyst (e.g. Ce and/or Zr), and/or it can include the catalysts that are typically included in a TWC. In some embodiments, the second stage catalytic converter 240 is a cGPF, in which case the second stage catalytic converter 240 and the GPF are merged into a single unit. In some embodiments, the second stage catalytic converter 240 and/or cGPF is integrated into a single unit that also includes the muffler 250. In an alternative embodiment, a GPF is disposed between the second stage catalytic converter 240 and the compressor 230 (e.g., as illustrated in FIG. 3).

When the exhaust gas is cooled by EGI 220 to $T_{mix}$ of about 300° F. to about 500° F., or about 400° F., as described above, more of the gaseous condensables (e.g., volatile unburned hydrocarbons) undergo a phase change and condense as liquids or solids. Thus, the reduction in temperature of the exhaust stream causes a higher fraction of the condensables in the exhaust stream to reach their liquid or solid phase while still contained in the exhaust gas stream than when the exhaust stream is not cooled. The reduction in temperature has the added benefit of forming more brown carbon when some of the gaseous condensables condense on the black carbon particles that act as nucleation sites during the phase change process.

The GPF or cGPF (in general, GPF) includes ceramic porous walls, ceramic wool, or other arrangement of permeable material structure 245 that traps particulate emissions, such as liquids (e.g., gaseous condensables) and black and brown carbon, in the exhaust. The porous walls and/or ceramic wool in permeable material structure 245 can be made of one of several materials fabricated as known in the art to collect particulate emissions. The porous walls and/or ceramic wool of permeable material structure 245 also collects the additional brown carbon and the liquid-phase condensables formed as a result of the lower exhaust temperature in the exhaust gas intercooler. Therefore, the reduction in temperature allows the GPF to trap more volatile hydrocarbon condensables, as liquid and as brown carbon, than it could when the exhaust is at a higher temperature (e.g., higher than $T_{mix}$ of about 300° F. to about 500° F., such as about 400° F.) where the liquid phase change does not occur. This reduction in the concentration in hydrocarbon condensables reduces the overall hydrocarbon emissions and reduces the chance of condensables forming particulates as the exhaust exits the tailpipe.

Embodiments of the technology described herein provide one or more of the following advantages:

(1) Cooling the exhaust gases in an exhaust gas intercooler (e.g., EGI 220) after the first stage catalytic converter 210 condenses a larger fraction of gaseous hydrocarbons into their liquid phase while they are still in the exhaust system. These can be captured by the GPF/cGPF, making it more effective in removing a larger fraction of the condensables in liquid form and as solid particulates (brown carbon) that carry the liquefied condensables.

(2) Cooling the exhaust gases in an exhaust gas intercooler (e.g., EGI 220) after the first stage catalytic converter 210 results in the formation of particles containing large fractions of semivolatiles (brown carbon) that can be more easily captured in the GPF due to their larger size. Because a higher fraction of the particles forming after the exhaust gas cooler has larger sizes, it helps the GPF filtration system remove more particulate mass and particulate numbers leaving the exhaust stream with a much smaller fraction of condensable hydrocarbons.

(3) Employing a catalyzed GPF (cGPF) can have the added benefit of replacing the second stage catalytic converter or reducing the size of second stage catalytic converter.

(4) Employing other forms of exhaust gas intercooling systems (i.e., different than EGI 220) that cool down the entire exhaust stream or fractions of it before treatment in the GPF/cGPF is also possible and will lead to similar benefits (5) The systems and processes described herein can be used in internal combustion engine designs that utilize cooled exhaust gas recirculation to reduce $NO_x$ formation in the engine and/or to improve the engine efficiency. Cooled exhaust gas recirculation is used to lower the combustion temperature in the engine and hence reducing the potential for knock without having to add extra fuel to cool the charge as is done in engines without cooled exhaust recirculation. Adding the extra fuel is undesirable because of its negative impact on the fuel economy and contribution to raising the pollutants.

(6) In a standard emissions system without intermediate exhaust cooling, the GPF/cGPF is regenerated by temporarily running the engine's AFR under fuel lean conditions to provide the extra oxygen at high temperature necessary to oxidize the particulate matter caught in the filter. This may greatly increase the formation and/or reformation of nitrogen oxides, for example in the second catalytic converter. Because the above system 20 includes additional air for oxidation (i.e., air ejected by compressor 230), regeneration of the GPF can be accomplished by temporarily increasing the temperature at the second stage catalytic converter 240 without changing the engine's AFR. While this will induce a slight increase in nitrogen oxides due to reformation, the overall tailpipe levels are much lower than would be produced by leaning the AFR. Nitrogen oxide reformation can be further reduced by increasing the temperature at a time when minimal fuel is consumed by the engine, such as when coasting down a hill or idling. Such regeneration can occur on a periodic basis, for example once a day, once a week, once every 1,000 miles, or other interval.

(7) The injection of air from the engine charger compressor improves the flow rate of exhaust, which decreases the back pressure of exhaust, which, and depending on the exhaust system design, that is, the port design, the conduits linking the port with the exhaust manifold, and other factors, can also lead to higher pressure near the exhaust valve. Slight rise in the back pressure can have beneficial effects on engine efficiency since it raises the fraction of the exhaust gases retained in the engine cylinders at the end of the exhaust process which helps reduce the combustion temperature and thus allow for spark advance and better efficiency without the likelihood of knocking.

FIG. 3 illustrates an exhaust aftertreatment system 30 according to one or more embodiments. System 30 is the same or similar to system 20 except as described below. In place of the combined second stage catalytic converter/cGPF 240 in system 20, system 30 includes a GPF 380 disposed between the inlet for the air ejected by compressor 230 and the inlet to second stage catalytic converter 340. In an alternative embodiment, the GPF 380 can be disposed between the outlet of EGI 220 and the inlet for the air ejected by compressor 230. The second stage catalytic converter 340 is otherwise the same or similar to second stage catalytic converter 240. For example, the second stage catalytic converter 340 can include one or more PGMs, one or more oxygen storage catalysts, and/or it can include a TWC in some embodiments.

GPF 380 is the same or similar to the GPF described above with respect to second stage catalytic converter/cGPF 240. For example, GPF 380 includes a coating 345 which is the same or similar to coating 245. Thus, coating 345 can trap black carbon, brown carbon, and condensables in liquid form. It is noted that if additional GPFs are desired in system 30, the second stage catalytic converter 340 can include a second GPF or, alternatively, it can include or can be a cGPF, as described above.

In an alternative embodiment, the compressor 230 and/or the second stage catalytic converter 340 are not included in system 30. When the compressor 230 and/or second stage catalytic converter 340 are removed from system 30, the GPF 345 still functions to trap black carbon, brown carbon, and condensables in liquid form, as discussed above. In some embodiments, compressor 230 can be a turbocharger compressor and/or a supercharger compressor associated with engine 200, as discussed above.

Figure 4:
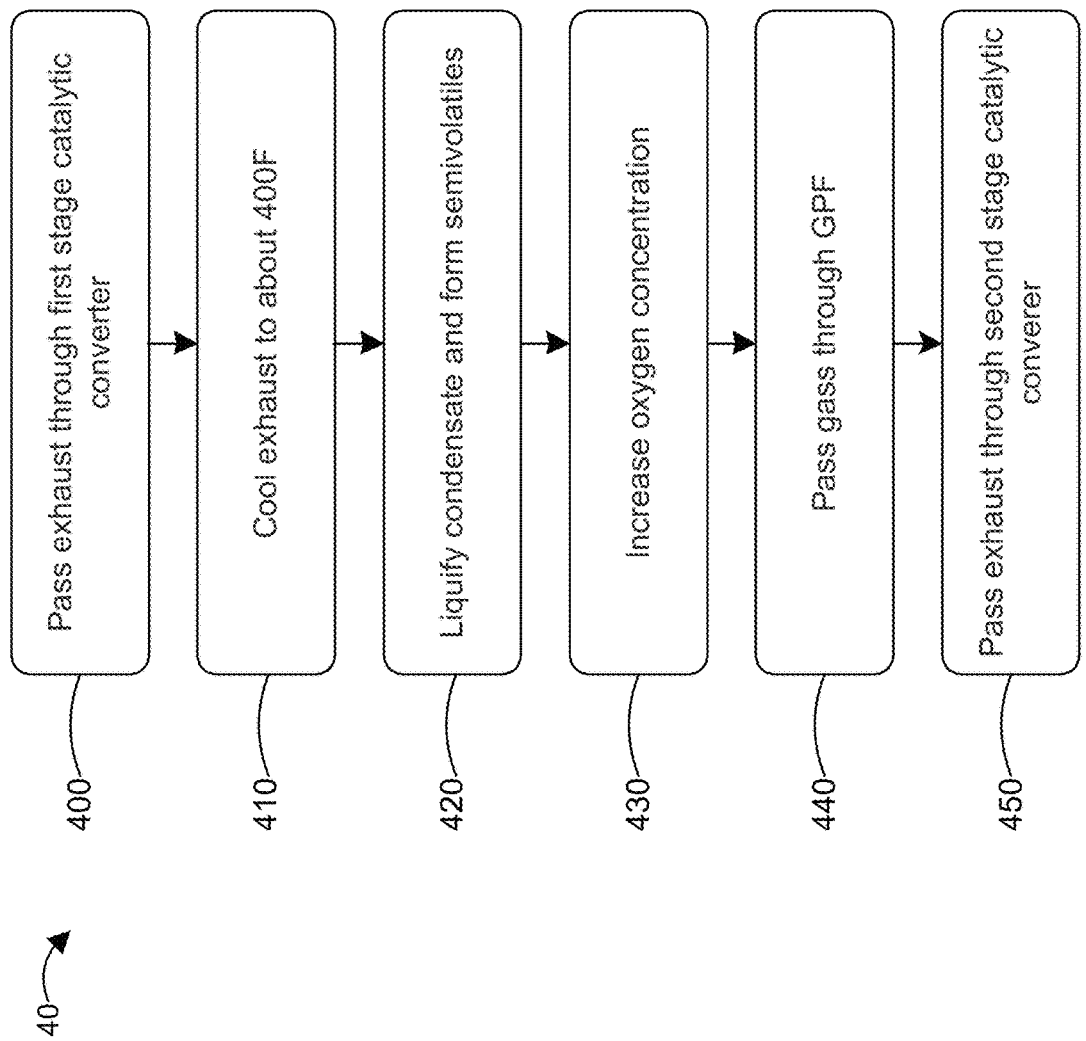
FIG. 4 is a flow chart of a method for reducing particulate matter, hydrocarbons, nitrogen oxides, and carbon monoxide from exhausts of internal combustion engines, according to one or more embodiments.

FIG. 4 is a flow chart 40 of a method for reducing particulate matter, hydrocarbons, nitrogen oxides, and carbon monoxide from exhausts of internal combustion engines. The method according to flow chart 40 can be performed on any of the systems described herein (e.g., systems 20, 30, 60, 70, 80, 90, and/or 1000). In step 400, the exhaust is passed through a first stage catalytic converter. The first stage catalytic converter includes one or more active catalytic elements (e.g., one or more PGMs and/or a TWC) that catalyzes a chemical reaction to reduce the concentration of nitrogen oxide compounds in the exhaust. The exhaust is generated by an internal combustion engine which can run at a stoichiometric or a rich AFR or a lean AFR, as described above. In step 410, the exhaust is cooled to about 400° F., such as about 300° F. to about 500° F. or about 350° F. to about 450° F. In some embodiments, the exhaust is cooled to about 300° F., about 325° F., about 350° F., about 375° F., about 400° F., about 425° F., about 450° F., about 475° F., about 500° F., or any value or range between any two of the foregoing values. The exhaust can be cooled by passing some or all of it through an exhaust gas intercooler (e.g., a heat exchanger or other cooling unit). As discussed above, a portion of the exhaust can bypass the cooling unit and the volume of cooled and bypassed exhaust can be controlled (e.g., by valves in communication with a controller) to provide the desired temperature.

In step 420, the cooled exhaust causes at least a portion of the volatile hydrocarbon condensables to undergo a phase change into a liquid. The liquid-phase condensables can remain as liquid and/or they can condense on the black carbon particles, that act as nucleation sites during the phase change process, to form semi volatile brown carbon, as discussed above. In step 430, the oxygen concentration in the cooled exhaust is increased to at least about 0.1% by volume, such as at least about 0.25% by volume, at least about 0.5% by volume, at least about 0.75% by volume, at least about 1% by volume, or a higher concentration. The oxygen concentration can be increased by ejecting air into the cooled exhaust stream, as described herein. In 440, the exhaust is passed through a GPF that includes a coating to trap the liquid-phase condensables and semi volatile particles formed in step 420 in addition to other particulates in the exhaust such as black carbon. In step 450, the exhaust is passed through a second stage catalytic converter. The second stage catalytic converter includes one or more active catalytic elements (e.g., one more PGMs; one or more oxygen storage catalysts, such as Ce and/or Zr; and/or a TWC) that catalyzes chemical reactions to reduce the concentration of unburned hydrocarbons and carbon monoxide in the exhaust. The second stage catalytic converter can also reduce the concentration of nitrogen oxide compounds in some embodiments. In some embodiments, the second stage catalytic converter is a cGPF, in which case steps 440 and 450 can be performed using the cGPF.

Figure 5:
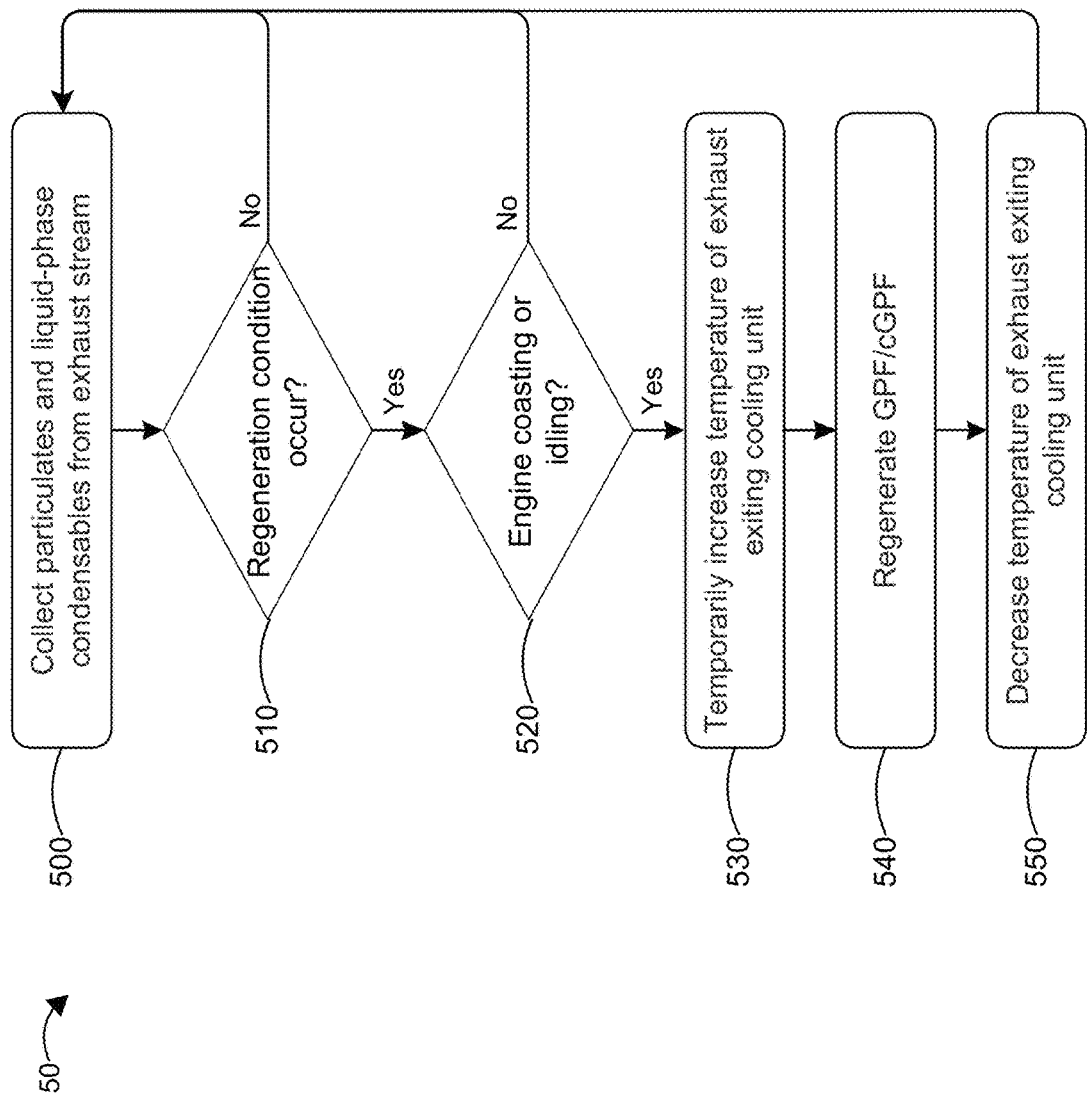
FIG. 5 is a flow chart of a method for operating and regenerating a GPF/cGPF in an exhaust aftertreatment system, according to one or more embodiments.

FIG. 5 is a flow chart 50 of a method for operating and regenerating a GPF/cGPF (in general, GPF) in an exhaust aftertreatment system. The method according to flow chart 50 can be performed on any of the systems described herein (e.g., systems 20, 30, 60, 70, 80, 90, and/or 1000). In step 500, the GPF collects particulates, such as black and brown carbon, and liquid-phase condensables from the exhaust stream. After a predetermined time period (e.g., once a day or every 100 miles), a controller in the exhaust aftertreatment system at step 510 determines whether a regeneration condition has occurred. The regeneration condition can be based on time (e.g., once a day, once a week, once a month, or other time period), based on mileage (e.g., every 500 miles, every 1,000 miles, or other mileage interval), based on the pressure drop across the GPF exceeds a predetermined value, based on a combination of time or mileage or pressure drop (e.g., once a week or once every 300 miles or when the pressure drops exceeds a predetermined value, whichever occurs first), or other factors. If the controller determines that the regeneration condition has not been met, the flow chart returns to step 500 and the GPF continues to collect particulates and liquid-phase condensables from the exhaust. If the controller determines that the regeneration condition has been met, the controller then determines at step 520 whether the engine is in an idling or coasting state, for example based on the engine's RPMs and/or the fuel intake of the engine. If the engine is not in an idling or coasting state, the flow chart 50 returns to step 500 and the GPF continues to collect particulates and liquid-phase condensables from the exhaust for a predetermined time period, which can be the same or less than the regeneration period used for the regeneration condition. For example, the predetermined time period can be less than an hour, such as 15 minutes, in some embodiments. In another example, the controller continuously checks whether the engine is in an idling or coasting state.

After the predetermined time period (or on a continuous basis), the controller proceeds through steps 510 and 520 to determine again whether the engine is in an idling or coasting state. When the controller determines at step 520 that the engine is in an idling or coasting state, the controller at step 530 causes the temperature of the exhaust exiting the cooling unit to increase (e.g., by adjusting a bypass valve and/or by adjusting the coolant flow rate, as described above) to reach a temperature sufficient to oxidize the particulates and liquid-phase condensables collected by the GPF. The temperature of the exhaust exiting the cooling unit can be increased to about 500° F. to about 1,000° F., such as about 600° F., about 700° F., about 800° F., about 900° F., or any value or range between any two of the foregoing values. In step 540, the GPF regenerates using the high temperature exhaust to oxidize the particulates and liquid-phase condensables collected by the GPF. After the GPF regeneration is complete or if the controller determines that the engine is no longer in an idling or coasting state, the controller causes the cooling unit to lower the temperature of the exhaust exiting the cooling unit to the operating temperature of about 300° F. to about 500° F., or about 400° F., as discussed above. After the exhaust temperature is decreased in step 550, the flow chart 50 returns to step 500 where the GPF collects particulates and liquid-phase condensables from the exhaust. If the GPF regeneration was completed in step 540, the controller resets the regeneration period when the flow chart 50 returns to step 500. If the GPF regeneration did not complete at step 540 because the engine was no longer in an idling or coasting state, the controller can reset the regeneration condition to a secondary regeneration condition (e.g., a shorter regeneration time period) when the flow chart 50 returns to step 500. Alternatively, the controller does not reset the regeneration condition in which case the flow chart 50 passes immediately to steps 510 and 520 in an attempt to complete the GPF regeneration process.

The unit acting as the PM filter (e.g., the GPF or cGPF) may also need to be cleaned of non-combustible materials, which cannot be removed through the oxidation/regeneration process described above, by physically removing and cleaning the unit, as done in other similar units in the vehicle. In some instances, the unit acting as the PM filter may need to be replaced.

Figure 6:
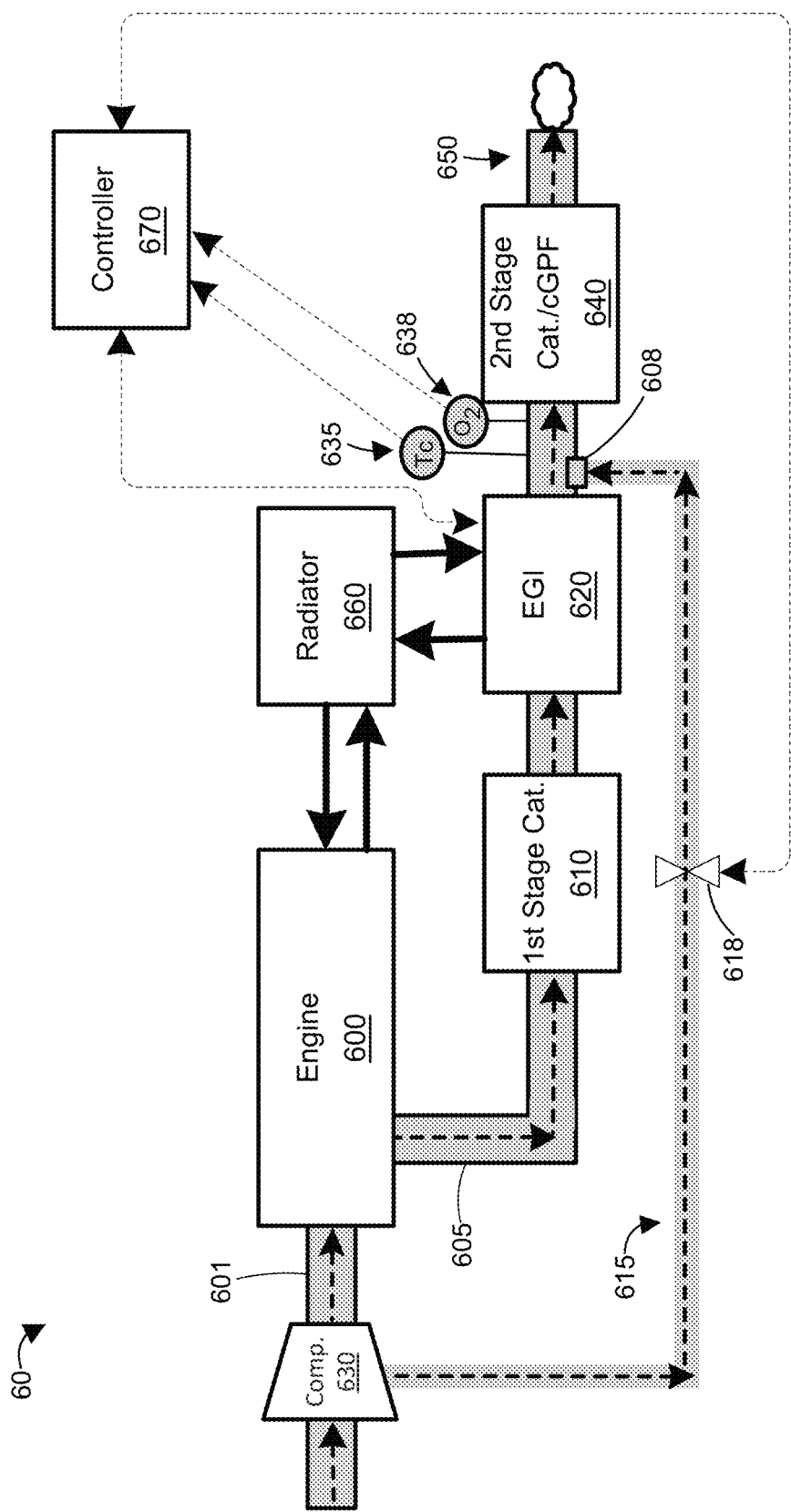
FIG. 6 is a block diagram of an exhaust aftertreatment system according to one or more embodiments.

FIG. 6 is a block diagram of an exhaust aftertreatment system 60 according to one or more embodiments. The exhaust aftertreatment system 60 includes a first stage catalytic converter 610, an exhaust gas intercooler (EGI) 620, an engine charger compressor 630, and a second stage catalytic converter 640. In operation, compressed air from engine charger compressor 630 flows through compressed air conduit 601 to the air intake of engine 600, which uses the compressed air to combust fuel. The engine charger compressor 630 can be a turbocharger compressor or a supercharger compressor for engine 600. For example, compressor 630 can be a turbine-driven compressor used to turbocharge engine 600. In another example, compressor 630 can be a mechanically-driven or an electrically-driven compressor (e.g., an e-compressor) used to supercharge engine 600. In some embodiments, engine 600 includes both a turbocharger compressor and a supercharger compressor.

Exhaust gas exits engine 600 through an exhaust conduit 605 that passes through the first stage catalytic converter 610, the EGI 620, and the second stage catalytic converter 640 to tail pipe 650. Engine 600 can operate with an air-fuel ratio (AFR) in the rich burn regime (i.e., greater than or equal to a stoichiometric AFR), and thus can produce exhaust gases that contain a minimal or a substantially zero oxygen content (e.g., as described above with respect to engine 200).

The first stage catalytic converter 610 can be the same or substantially the same as first stage catalytic converter 210 described above. Thus, first stage catalytic converter 610 can include a catalyst comprising one or more PGMs, such as Pt, Pd, and/or Rh. In some embodiments, the first stage catalytic converter 610 includes a TWC. The first stage catalytic converter 610 promotes chemical reactions (e.g., reduction reactions) that remove $NO_x$ compounds from the exhaust stream (e.g., by reducing $NO_x$ to form $N_2$ and $O_2$). The first stage catalytic converter 610 can also promote chemical reactions that reduce the concentration of CO and $C_xH_y$ compounds from the exhaust stream.

After passing through the first stage catalytic converter 610, the exhaust flows into the EGI 620, which can be the same or substantially the same as EGI 220 described above. EGI 620 lowers the temperature of the exhaust to about 400° F., such as about 300° F. to about 500° F. or about 350° F. to about 450° F. In some embodiments, EGI 620 lowers the temperature of the exhaust to about 300° F., about 325° F., about 350° F., about 375° F., about 400° F., about 425° F., about 450° F., about 475° F., about 500° F., or any value or range between any two of the foregoing values. The EGI 620 includes a cooled path in which EGI 620 cools the exhaust and an optional bypass path that is not cooled by the EGI 620 (e.g., as described above with respect to EGI 220). The EGI 620 can be a heat exchanger or other cooling device, which receives radiator cooling fluid from radiator 660. Examples of the fluid circuits through which the radiator cooling fluid can flow are illustrated in FIGS. 12 and 14-16. EGI 620 cools the exhaust with radiator fluid received from radiator 660, which also provides radiator fluid to cool engine 600.

After the exhaust gas exits the EGI 620, it passes through exhaust conduit 605 to the second stage catalytic converter 640. The exhaust conduit 605 includes an inlet port 608 disposed between the EGI 620 and the second stage catalytic converter 640. The inlet port 608 fluidly couples an air injection conduit 615 to exhaust conduit 605. The air injection conduit 615 extends to compressor 630 (as illustrated)

or to compressed air conduit 601. In operation, a portion of compressed air produced by compressor 630 flows through air injection conduit 615 and is ejected into exhaust conduit 605 through inlet port 608. As a result of introducing compressed air into exhaust conduit 605, the exhaust gas has an increased oxygen content before it passes through second stage catalytic converter 640 than it does when the exhaust gas enters first stage catalytic converter 610. For example, the oxygen content of the exhaust gas can be at least about 0.1% by volume, such as at least about 0.25% by volume, at least about 0.5% by volume, at least about 0.75% by volume, at least about 1% by volume, or a higher concentration. A secondary benefit of ejecting compressed air into exhaust conduit 605 is that it causes a reduction of the pressure drop across the aftertreatment system 60 and the increased flow rate of the compressed air improves the flow of exhaust towards tail pipe 650. The improved flow of exhaust towards tail pipe 650 decreases the back pressure of exhaust in the exhaust conduit 605 immediately downstream of the engine 600 (e.g., between inlet port 608 and engine 600). A reduced back pressure of exhaust improves efficiency/mileage and/or performance of engine 600. While in general undesirable, under some circumstances a slight back pressure in the exhaust pipe downstream of the exhaust port can be beneficial; it forces more of the exhaust gas go back into the engine cylinders leading to the reduction of the combustion temperature and a reduction of the likelihood of knocking. This can be used by the engine control unit to advance the spark and further improve the engine efficiency.

A thermocouple 635 and an oxygen sensor 638 are preferably disposed between the inlet port 608 of exhaust conduit 605 and the second stage catalytic converter 640. The thermocouple 635 measures the temperature of the exhaust and provides the measured temperature as an input to a microprocessor-based controller 670 to control the exhaust temperature (e.g., as described above). The oxygen sensor 638 measures the oxygen concentration in the exhaust and provides the measured oxygen concentration as an input to controller 670 for the vehicle to control the oxygen concentration. To adjust the oxygen concentration, controller 670 adjusts the operating position of flow control valve 618 which is in electrical communication with controller 670. Controller 670 compares the measured oxygen content with a target oxygen concentration or target oxygen concentration range (e.g., as described above) and adjusts the operating position of flow control valve 618 accordingly. Control valve 618 can be a throttle valve, a butterfly valve, a ball valve, a check valve, a globe valve, a solenoid valve, or other valve.

The second stage catalytic converter 640 can be the same or substantially the same as second stage catalytic converter 240 described above. Thus, second stage catalytic converter 640 can include a catalyst comprising one or more PGMs, such as Pt, Pd, and/or Rh. In some embodiments, the second stage catalytic converter 610 includes a TWC. In some embodiments, the second stage catalytic converter 640 can include one or more oxygen storage catalysts, such as Ce and/or Zr. As with second stage catalytic converter 240, second stage catalytic converter 640 can also include a GPF as a modular or integrated unit. In some embodiments, second stage catalytic converter 640 can include or can be a cGPF.

Figure 7:
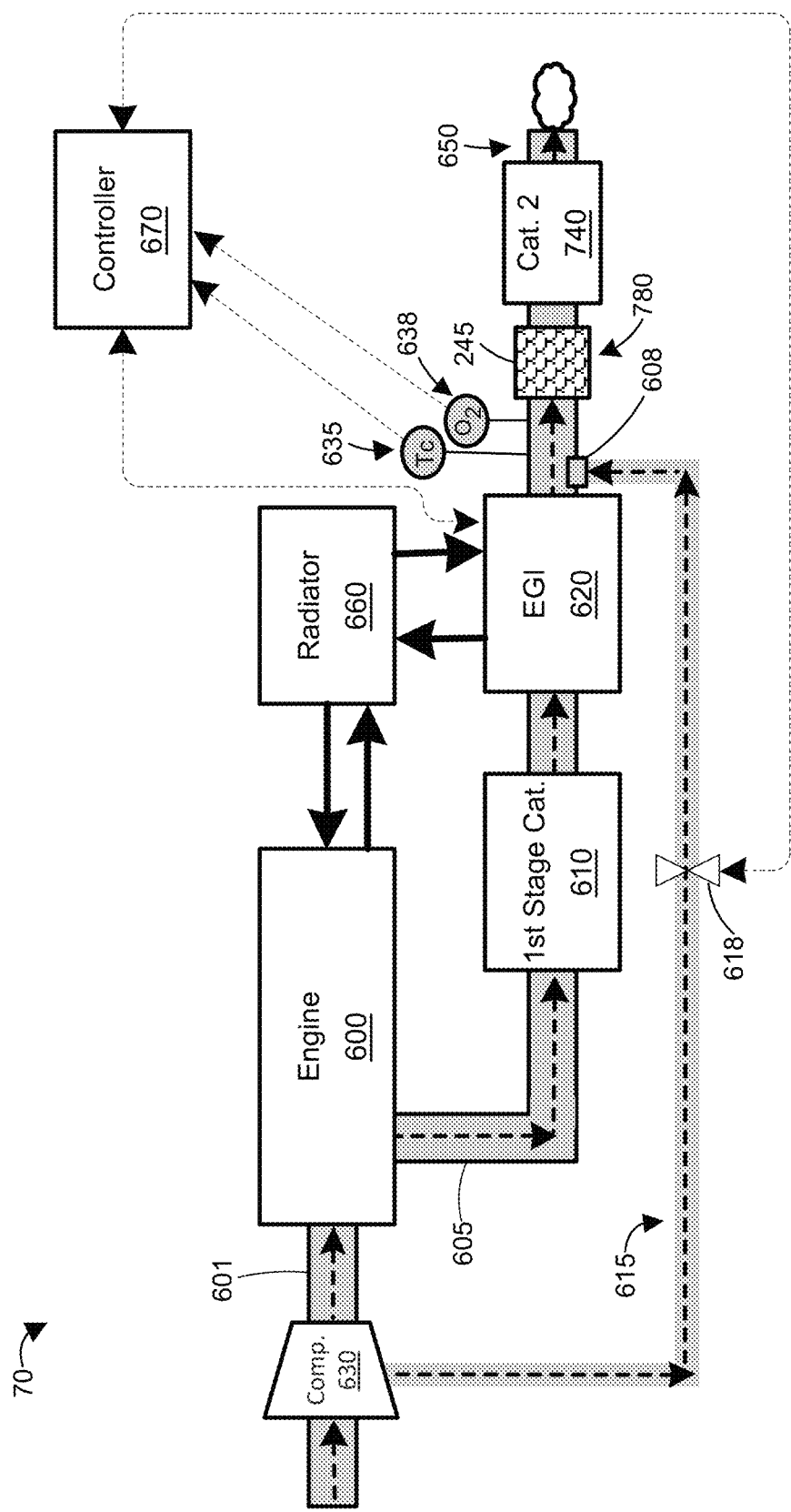
FIG. 7 is a block diagram of an exhaust aftertreatment system according to one or more embodiments.

FIG. 7 illustrates an exhaust aftertreatment system 70 that is an alternative embodiment of system 60. System 70 is the same or similar to system 60 except as described below. In place of the optional combined second stage catalytic converter/cGPF 640 in system 60, system 70 includes a GPF 780 disposed between the inlet port 608 of exhaust conduit 605 and the inlet to second stage catalytic converter 740. GPF 780 can be the same or substantially the same as GPF 380, described above. In an alternative embodiment, the GPF 780 can be disposed between the outlet of EGI 620 and the inlet port 608. The second stage catalytic converter 740 is otherwise the same or similar to second stage catalytic converter 640. For example, second stage catalytic converter 740 can include one or more PGMs, one or more oxygen storage catalysts, and/or a TWC.

Figure 8:
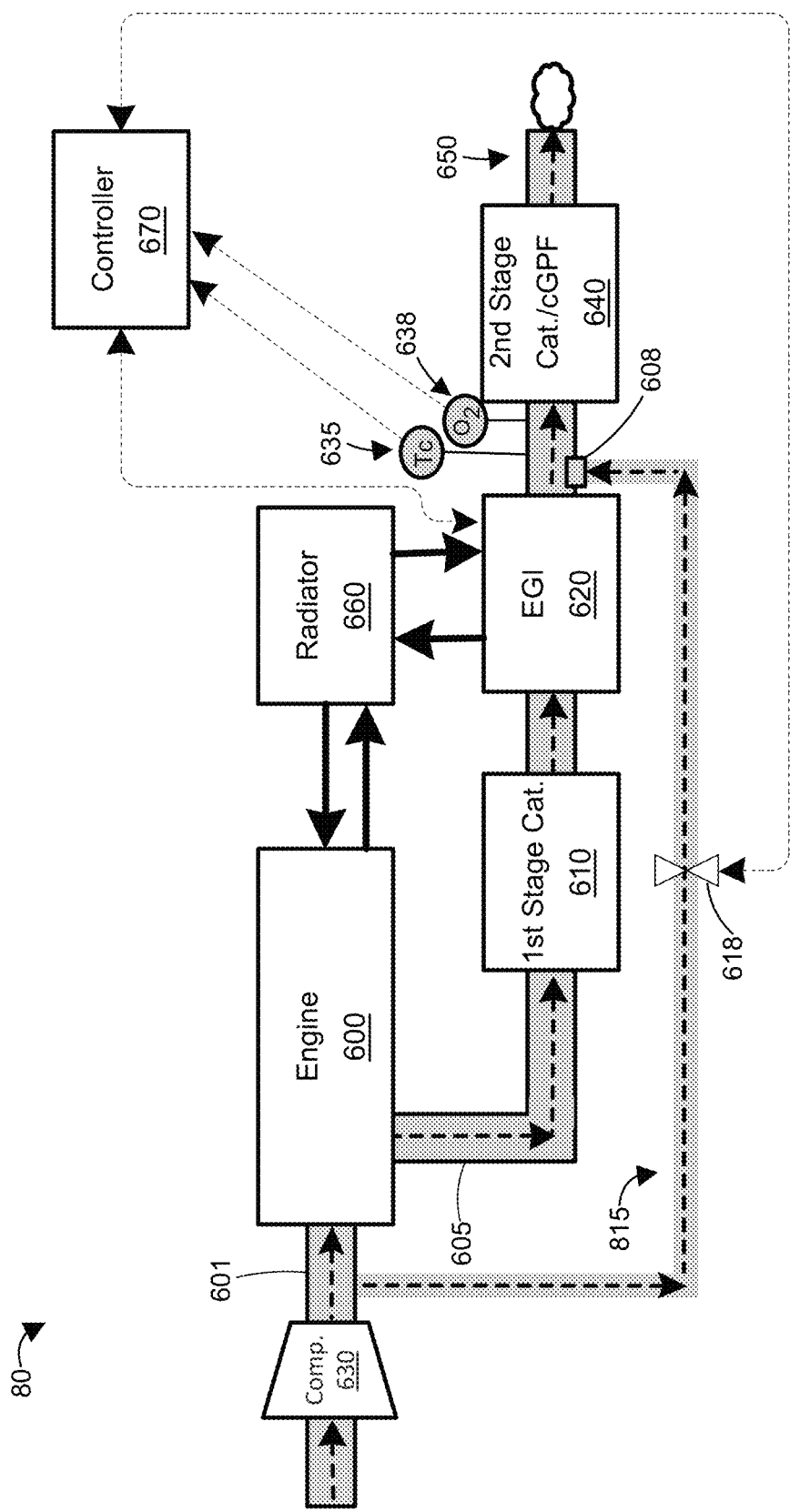
FIG. 8 is a block diagram of an exhaust aftertreatment system according to one or more embodiments.

FIG. 8 illustrates an exhaust aftertreatment system 80 that is an alternative embodiment of system 60. System 80 is the same or similar to system 60 except that the air injection conduit 815 is coupled to compressed air conduit 601 instead of charger compressor 630.

Figure 9:
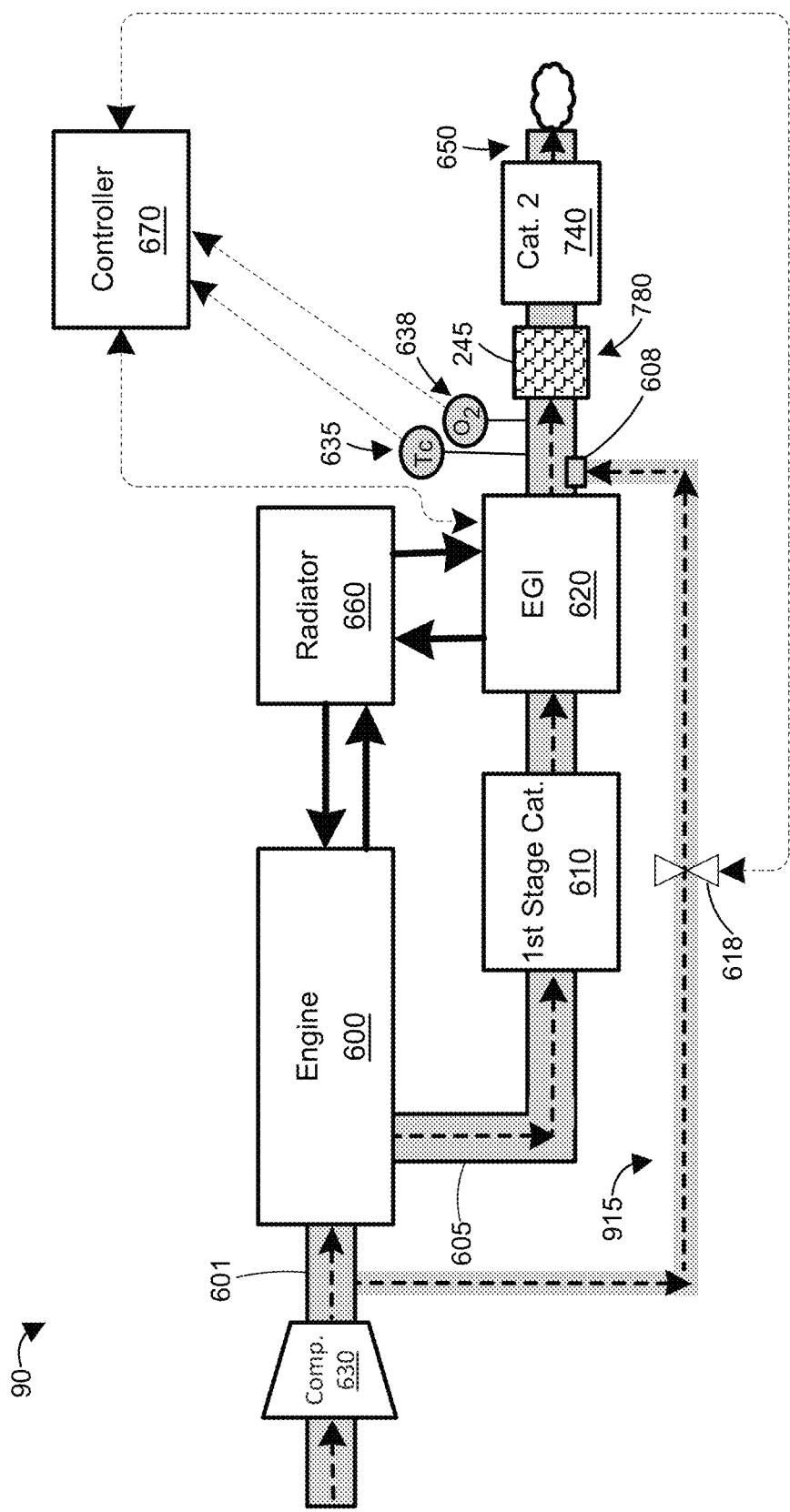
FIG. 9 is a block diagram of an exhaust aftertreatment system according to one or more embodiments.

FIG. 9 illustrates an exhaust aftertreatment system 90 that is an alternative embodiment of system 70. System 90 is the same or similar to system 70 except that the air injection conduit 915 is coupled to compressed air conduit 601 instead of charger compressor 630. It is noted that GPF 780 is an optional feature in system 90. Thus, GPF 780 can be removed from system 90 in some embodiments. Additionally, GPF 780 can be combined with second stage catalytic converter 740 as a modular or integrated unit of second stage catalytic converter 740. In some embodiments, second stage catalytic converter 740 is or includes a cGPF, in which case GPF 780 and second stage catalytic converter 740 are merged into the cGPF (e.g., as described above with respect to FIGS. 2, 6, and 8).

Figure 10:
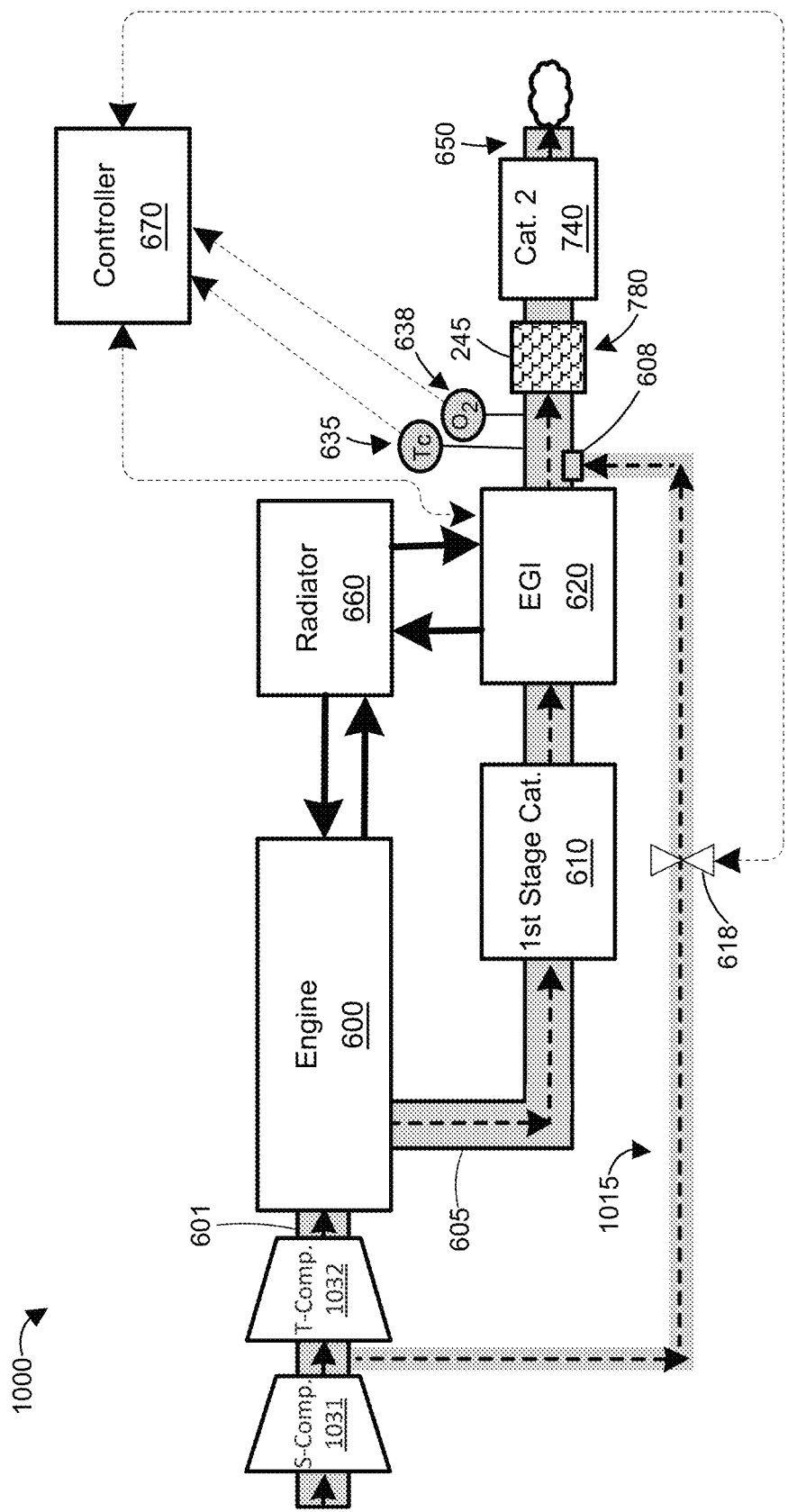
FIG. 10 is a block diagram of an exhaust aftertreatment system according to one or more embodiments.

FIG. 10 illustrates an exhaust aftertreatment system 1000 that is an alternative embodiment of systems 70 and 90. System 90 is the same or similar to systems 70 and 90 except that the air injection conduit 1015 is coupled to compressed air conduit 601 between supercharger compressor 1031 and turbocharger compressor 1032. Supercharger compressor 1031 can be a mechanically-driven or an electrically-driven compressor (e.g., an e-compressor) used to supercharge engine 600. Turbocharger compressor 1032 can be a turbine-driven compressor (e.g., coupled to a turbine in exhaust conduit 605). Air injection conduit 1015 can alternatively be coupled to supercharger compressor 1031, to turbocharger compressor 1032, or to compressed air conduit 601 between turbocharger compressor 1032 and engine 600.

It is noted that GPF 780 is an optional feature in system 1000. Thus, GPF 780 can be removed from system 1000 in some embodiments. Additionally, GPF 780 can be combined with second stage catalytic converter 740 as a modular or integrated unit of second stage catalytic converter 740. In some embodiments, second stage catalytic converter 740 is or includes a cGPF, in which case GPF 780 and second stage catalytic converter 740 are merged into the cGPF (e.g., as described above with respect to FIGS. 2 and 6).

Figure 11:
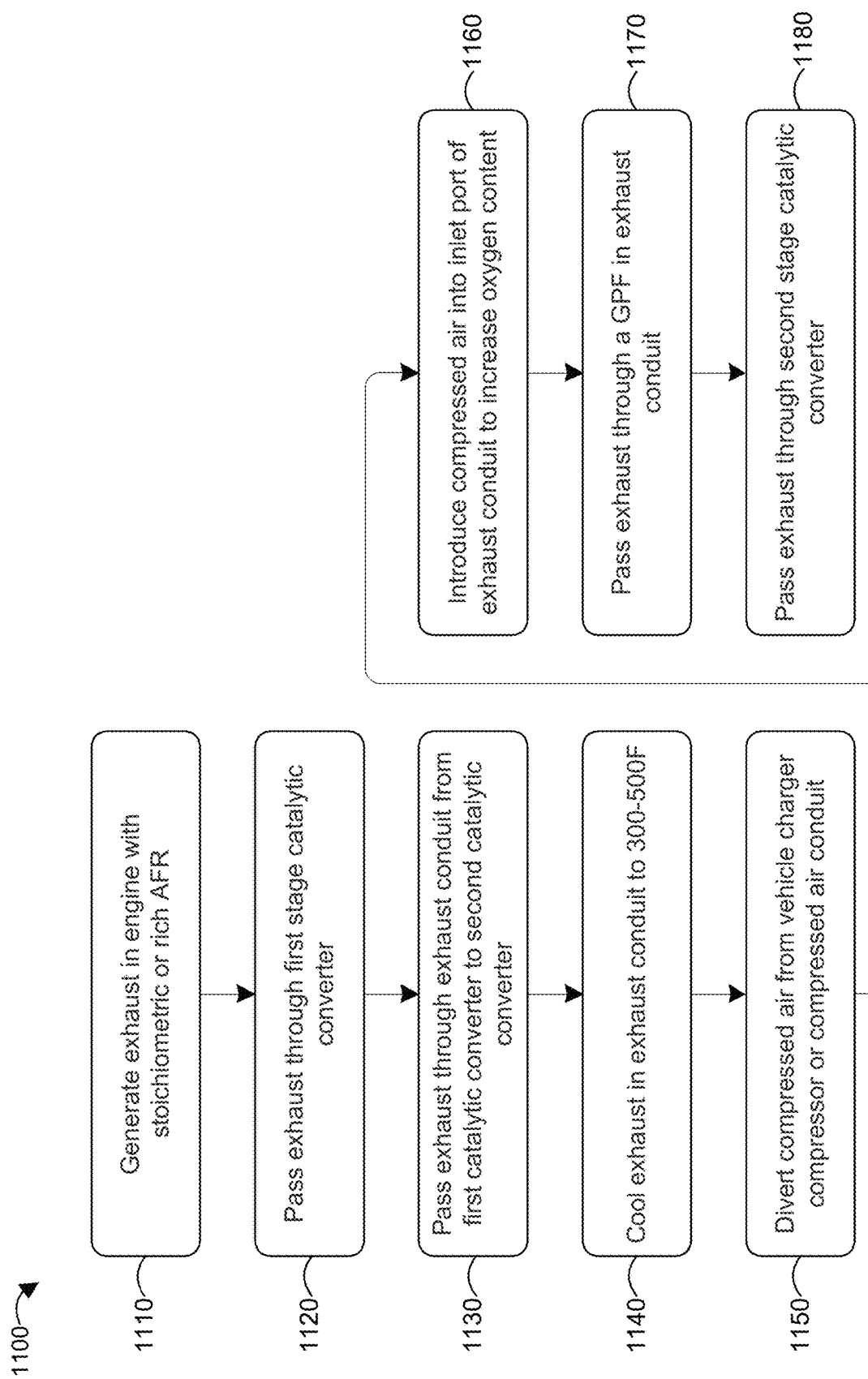
FIG. 11 is a flow chart that illustrates a method of treating exhaust from an engine according to one or more embodiments.

FIG. 11 is a flow chart 1100 that illustrates a method of treating exhaust from an engine according to one or more embodiments. The method according to flow chart 1100 can be performed on any of the systems described herein (e.g., systems 20, 30, 60, 70, 80, 90, and/or 1000). In step 1110, an internal combustion engine running at a stoichiometric or a rich AFR generates exhaust, which is free or substantially free of oxygen (e.g., as described above). Alternatively, the internal combustion engine can run at a lean AFR. In step 1120, the exhaust is passed through a first stage catalytic converter. The first stage catalytic converter includes one or more active catalytic elements (e.g., a PGM and/or a TWC) that catalyzes a chemical reaction to reduce the concentration of nitrogen oxide compounds in the exhaust. The first stage catalytic converter can also promote chemical reactions that reduce the concentration of CO and $C_xH_y$ compounds from the exhaust. In step 1130, the exhaust is passed through an exhaust conduit that extends from the first stage catalytic converter to a second stage catalytic converter. In step 1140, the exhaust is cooled to about 400° F., such as about 300° F. to about 500° F. or about 350° F. to about 450° F. In some embodiments, the exhaust is cooled to about 300° F., about 325° F., about 350° F., about 375° F., about 400° F., about 425° F., about 450° F., about 475° F., about 500° F., or any value or range between any two of the foregoing values. In some embodiments, the exhaust is cooled using an exhaust gas intercooler, such as a heat exchanger. The exhaust gas intercooler can include a coolant loop that is in thermal communication with the vehicle's radiator. The vehicle's microprocessor-based controller can adjust the cooling (e.g., by adjusting the bypass valve and/or the flow rate of the coolant loop) based on feedback from a thermocouple disposed in the exhaust conduit between the exhaust gas intercooler and a second stage catalytic converter.

In step 1150, a stream of compressed air is diverted from the vehicle's charger compressor (e.g., a turbocharger compressor or a supercharger compressor), which compresses air for use in the vehicle's engine, into an air injection conduit. Alternatively, the stream of compressed air is diverted into the air injection conduit from a compressed air conduit that extends from the vehicle's charger compressor to the engine. In step 1160, at least a portion of the diverted compressed air in air injection conduit is introduced into an inlet port in the exhaust conduit to increase the oxygen concentration in the exhaust. The flow rate of air ejected into the inlet port can be controlled by adjusting the operating position of a valve in the air injection conduit. The vehicle's microprocessor-based controller can adjust the operating position of the valve (e.g., through electromechanical action) based on feedback from an oxygen sensor disposed in the exhaust conduit between the inlet port in the exhaust conduit and the second stage catalytic converter. In some embodiments, the controller has a target oxygen concentration or a target oxygen concentration range (e.g., as described above), and the operating position of the valve is adjusted so that the measured oxygen concentration is equal or substantially equal to the target oxygen concentration or target oxygen concentration range.

In step 1170, the cooled exhaust is passed through a GPF, which collects liquid-phase condensables, semivolatile particles, and other particulates in the exhaust such as black carbon (e.g., as described above with respect to FIG. 4). The oxygen concentration in the exhaust is optionally increased before passing the exhaust through the GPF (i.e., step 1160 optionally occurs before step 1170).

In step 1180, the exhaust is passed through a second stage catalytic converter. The second stage catalytic converter includes one or more active catalytic elements (e.g., one or more PGMs, one or more oxygen storage catalysts, and/or a TWC) that catalyzes chemical reactions to reduce the concentration of unburned hydrocarbons and carbon monoxide in the exhaust. The second stage catalytic converter can also reduce the concentration of nitrogen oxide compounds in some embodiments. In some embodiments, the second stage catalytic converter is a cGPF, in which case steps 1160 and 1170 can be performed using the cGPF.

Figure 12:
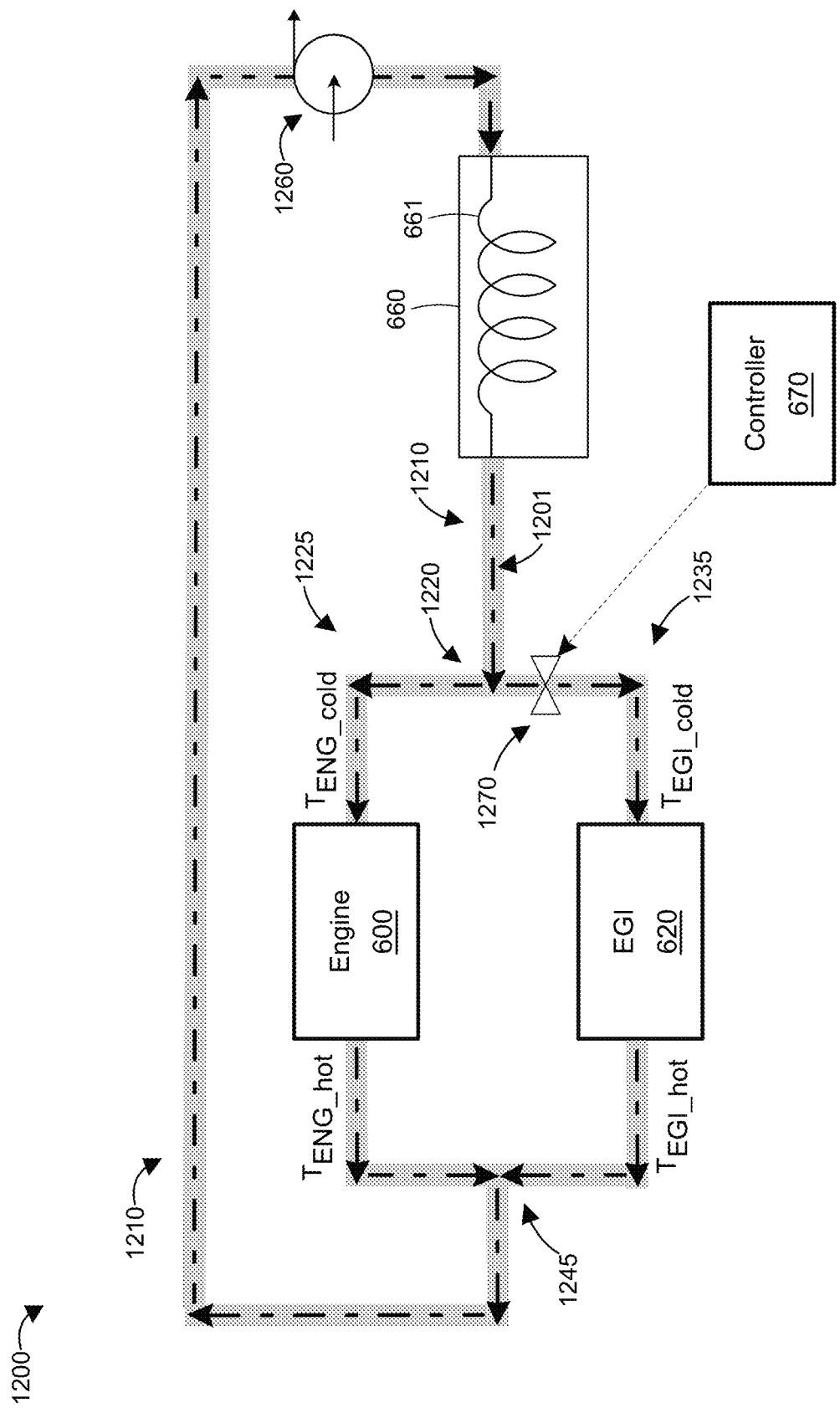
FIG. 12 illustrates an exemplary system including parallel radiator cooling fluid circuits for providing radiator cooling fluid to the engine and EGI according to one or more embodiments.

FIG. 12 illustrates an exemplary system 1200 including parallel radiator cooling fluid circuits for providing radiator cooling fluid 1201 to engine 600 and EGI 620 according to one or more embodiments. The parallel radiator cooling fluid circuits include an engine cooling circuit 1225 and an EGI circuit 1235. The engine cooling circuit 1225 provides radiator cooling fluid 1201 to cool engine 600. The EGI circuit 1235 provides radiator cooling fluid 1201 to cool exhaust that flows through EGI 620. The radiator cooling fluid 1201 can be pure water or a mixture of water and antifreeze (e.g., ethylene glycol). For example, the radiator cooling fluid 1201 can have a concentration of 10-60% ethylene glycol by volume.

In operation, radiator cooling fluid 1201 passes through a radiator coil 661 in radiator 660, which cools the radiator cooling fluid 1201 from a high temperature $T_H$ to a low temperature $T_L$. The cooling of the radiator cooling fluid 1201 in radiator coil 661 can be enhanced by passing a stream of air across the external surface of radiator coil 661 to remove thermal energy therefrom. The stream of air can be generated by movement of a vehicle driven by engine 600. In addition or in the alternative, the stream of air can be generated by a fan or other device that circulates air while the engine 600 is stationary, such as in a CHP system.

After passing through radiator 660, the radiator cooling fluid 1201 flows through radiator outlet conduit 1210 until it reaches junction 1220. At junction 1220, a first volume of radiator cooling fluid 1201 passes into engine cooling circuit 1225 and a second volume of radiator cooling fluid 1201 passes into EGI circuit 1235. The first and second volumes of radiator cooling fluid 1201 pass through engine cooling circuit 1225 and EGI circuit 1235, respectively, fluidically in parallel.

After passing through engine cooling circuit 1225 and EGI circuit 1235, the first and second volumes of radiator cooling fluid 1201 recombine at junction 1245. The recombined radiator cooling fluid 1201 then returns to the inlet of radiator 660 via radiator return conduit 1250. A pump 1260 is in fluid communication with the radiator return conduit 1250 to circulate the radiator cooling fluid 1201 in system 1200 including the parallel radiator cooling fluid circuits.

A valve 1270 is disposed in EGI circuit 1235 proximal to junction 1220. Controller 670 adjusts the operating position of valve 1270 to control the volume and/or flow rate of radiator cooling fluid 1201 that flows through EGI circuit 1135. The volume and/or flow rate of radiator cooling fluid 1201 that flows through EGI circuit 1335 corresponds to the amount of exhaust gas thermal energy that can be removed by EGI 620. For example, the amount of exhaust gas thermal energy that can be removed by radiator cooling fluid 1201 in EGI 620 can be calculated according to Equation 1 below, where $\dot{Q}_{EGI}$ is the amount of thermal energy per unit time (e.g., watts) removed or absorbed by the radiator cooling fluid in the EGI, $\dot{m}_{EGI}$ is the mass flow rate of radiator cooling fluid 1201 flowing through EGI circuit 1235, Cp is the heat capacity of the radiator cooling fluid 1201, and $\Delta T_{EGI}$ is the difference between the temperature of radiator cooling fluid 1201 that enters EGI 620 ($T_{EGI\_cold}$) and the temperature of radiator cooling fluid that exits EGI 620 ($T_{EGI\_hot}$). Thus it can be seen that increasing the flow rate of radiator cooling fluid through EGI 620 causes $\dot{Q}_{EGI}$ to increase while decreasing the flow rate of radiation cooling fluid through EGI 620 causes $\dot{Q}_{EGI}$ to decrease.

Likewise, the amount of exhaust gas thermal energy that can be removed by radiator cooling fluid 1201 in engine 600 can be calculated according to Equation 2 below, where $\dot{Q}_{ENG}$ is the amount of thermal energy per unit time (e.g., watts) removed or absorbed by the radiator cooling fluid in the EGI, $\dot{m}_{EGI}$ is the mass flow rate of radiator cooling fluid 1201 flowing through EGI circuit 1235, Cp is the heat capacity of the radiator cooling fluid 1201, and $\Delta T_{ENG}$ is the difference between the temperature of radiator cooling fluid 1201 that enters engine 600 ($T_{ENG\_cold}$) and the temperature of radiator cooling fluid 1201 that exits engine 600 ($T_{ENG\_Hot}$). In some embodiments, $\dot{Q}_{EGI}$ can be equal to or approximately equal to $\dot{Q}_{ENG}$. The maximum temperature of the radiator cooling fluid 1201 that exits EGI 620 and engine 600 (i.e., $T_{EGI\_hot}$ and $T_{ENG\_hot}$, respectively) can be determined by the composition of radiator cooling fluid 1201. For example, the maximum temperature of the radiator cooling fluid 1201 can be 100° C. if the radiator cooling fluid 1201 is pure water. If the radiator cooling fluid 1201 includes 10-60% ethylene glycol by volume, the maximum temperature of the radiator cooling fluid 1201 can be about 110° C. to about 150° C.

$$\dot{Q}_{EGI} = \dot{m}_{EGI} * Cp * \Delta T_{EGI} \quad (1)$$

$$\dot{Q}_{ENG} = \dot{m}_{ENG} * CP * \Delta T_{ENG} \quad (2)$$

Controller 670 can receive as an input the temperature of the exhaust gas exiting EGI 620 and can adjust the operating position of valve 1270 so that the temperature of the exhaust exiting EGI 620 is equal to a set point temperature. For example, controller 670 can adjust the operating position of valve 1270 so that the temperature of the exhaust exiting EGI 620 is equal to about 300° F. to about 500° F., including about 200° C., or other value or range as discussed herein. The temperature of the exhaust entering 620 can be about 800° F. to about 1300° F. including about 600° C. to about 700° C., or any value or range between any two of the foregoing temperatures. Thus, the set point temperature of the exhaust gas exiting EGI 620 can be controlled using valve 1270. EGI 620 can also include an optional bypass path and bypass valve for exhaust gas (e.g., as described above with respect to EGI 220). As such, controller 670 can control the temperature of the exhaust gas exiting EGI 620 by adjusting the operating position of valve 1270 (to control the volume/flow rate of radiator cooling fluid 1201 passing through EGI 620) and/or by adjusting the bypass valve (to control the relative amount of exhaust gas that is cooled and that bypasses EGI 620).

Figure 13:
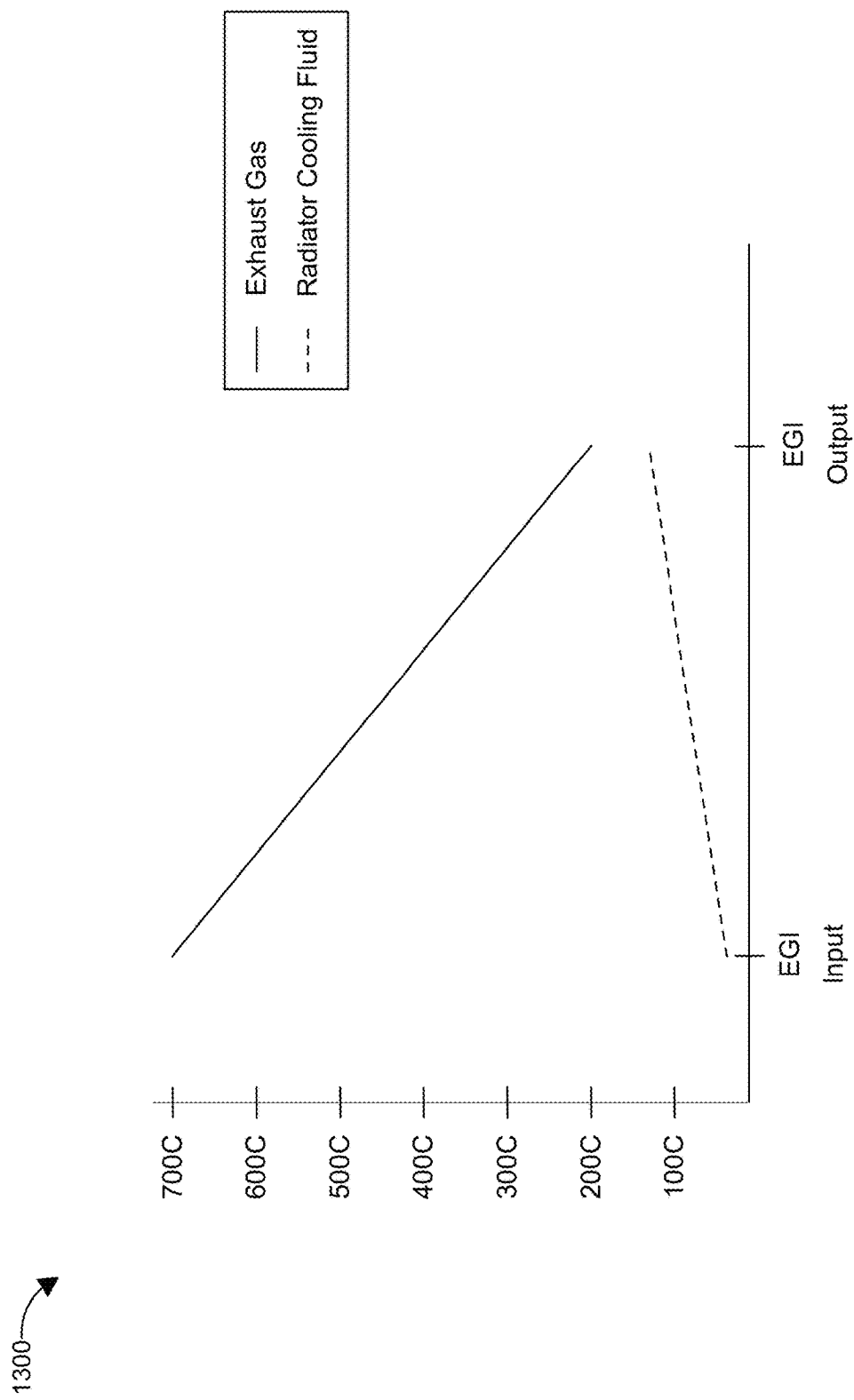
FIG. 13 is an example graph of the change in temperature of the radiator cooling fluid and exhaust gas across the EGI.

The flow rate of radiator cooling fluid 1201 can be determined according to the respective changes in temperature of the exhaust gas and radiator cooling fluid 1201 and the respective flow rates and properties (e.g., heat capacity) of the exhaust and radiator cooling fluid 1201 passing through EGI 620. For example, the change in temperature of exhaust gas ($\Delta T_{EXH}$) can be about 400° C. to about 500° C., assuming an input temperature of about 700° C. and output temperature of about 200° C. The change in temperature of radiator cooling fluid 1201 ($\Delta T_{FLUID}$) can be about 100° C. depending on the input temperature of radiator cooling fluid 1201 and the maximum temperature (due to its composition) of radiator cooling fluid 1201, as discussed above. For example, the input temperature of radiator cooling fluid 1201 to EGI 620 can be about 25° C. (if it's not preheated) and the output temperature of radiator cooling fluid 1201 from EGI 620 can be about 125° C. In some embodiments, the radiator cooling fluid 1201 is preheated and thus ($\Delta T_{FLUID}$) can be less than 100° C. An example graph 1300 of the change in temperature ($\Delta T_{EXH}$ and $\Delta T_{FLUID}$) across EGI 620 is illustrated in FIG. 13.

The foregoing exemplary system 1200 including parallel radiator cooling fluid circuits can be incorporated in any of the exhaust aftertreatment systems described herein (e.g., as illustrated and described with respect to any of FIGS. 2, 3, 6-10, and 13).

Figure 14:
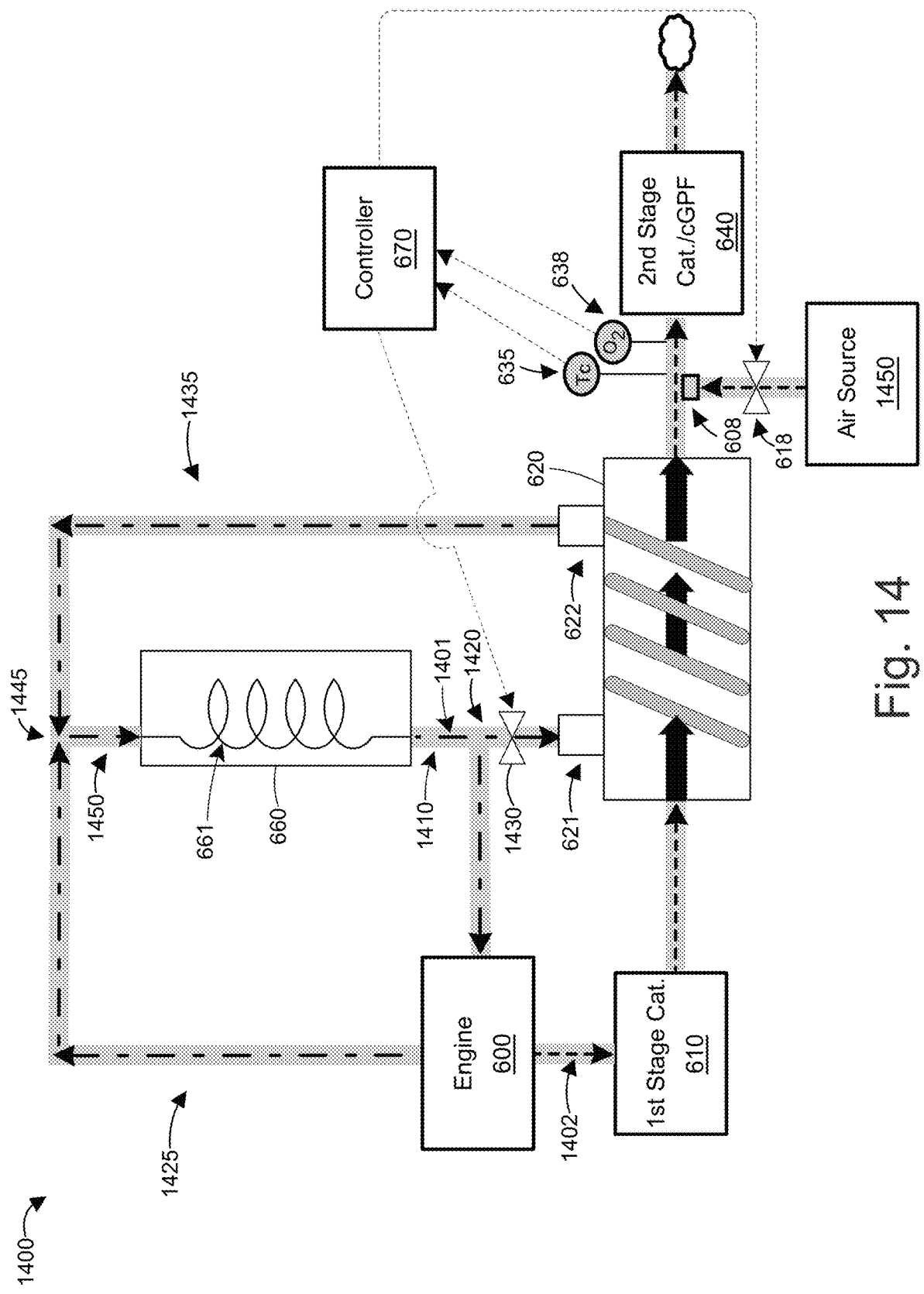
FIG. 14 illustrates an example of an exhaust aftertreatment system that includes parallel radiator cooling fluid circuits according to one or more embodiments.

FIG. 14 illustrates an example of an exhaust aftertreatment system 1400 that includes parallel radiator cooling fluid circuits according to one or more embodiments. Similar to FIG. 12, radiator cooling fluid 1401 is cooled as it passes through radiator coil 661 in radiator 660. The radiator cooling fluid 1401 exits the radiator 660 through radiator outlet conduit 1410 and is diverted at junction 1420 such that a first volume or radiator cooling fluid 1401 flows through engine cooling circuit 1425 and a second volume or radiator cooling fluid 1401 flows through EGI circuit 1435. The radiator cooling fluid 1401 that flows through engine cooling circuit 1425 flows into channels defined in engine 600 to cool engine 600 as known in the art. The radiator cooling fluid 1401 exiting engine 600 is at a higher temperature than it is when entering engine 600. After the radiator cooling fluid 1401 exits the engine 600, it follows engine cooling circuit 1425 to junction 1445. It is noted that a pump (e.g., pump 1260) is in fluid communication with the radiator cooling fluid 1401 to circulate it in engine cooling circuit 1425 and EGI circuit 1435, though such a pump is not illustrated in FIG. 14 for clarity only.

At junction 1420, a portion of the radiator cooling fluid 1401 is diverted from engine cooling circuit 1425 to EGI circuit 1435. The volume and/or flow rate of radiator cooling fluid 1401 that flows through EGI circuit 1435 can be controlled by adjusting the operating position of valve 1430 via controller 670. The volume and/or flow rate of radiator cooling fluid 1401 flowing through EGI circuit 1435 can be adjusted such that the temperature of the exhaust 1402 is at a set point temperature (e.g., about 300° F. to about 500° F., or other value or range as discussed herein) as it enters second stage catalytic converter 640, for example as measured by thermocouple 635. Thermocouple 635 is disposed downstream of the inlet port 608 for air source 1450 so that the temperature measured by thermocouple 635, which is received as an input by controller 670, accounts for any temperature change of the exhaust 1402 caused by the introduction of air from air source 1450.

Air source 1450 can be a dedicated air compressor for exhaust aftertreatment system 1400 or it can be an air compressor shared by other component such as an engine charger compressor, as discussed herein. The volume of air introduced by air source 1450 can be adjusted by controller 670 using valve 618. Controller 670 receives as an input the oxygen concentration of exhaust 1402 measured by oxygen sensor 638, which is disposed between inlet port 608 and second stage catalytic converter 640. Thus, controller 670 can adjust the valve 618 so that the oxygen concentration measured by oxygen sensor 638 is equal to a target oxygen concentration, such as at least about 0.1% by volume, such as at least about 0.25% by volume, at least about 0.5% by volume, at least about 0.75% by volume, at least about 1% by volume, or a higher concentration. As discussed herein, second stage catalytic converter 640 can be or can include a cGPF or can have a GPF as a separate unit (e.g., attached thereto).

After the radiator cooling fluid 1401 flows out of EGI outlet port 622, it follows EGI circuit 1435 to junction 1445. At junction 1445, the radiator cooling fluid 1401 in the return paths from engine cooling circuit 1425 and EGI circuit 1435 combines and flows into radiator inlet conduit 1450 to radiator 660. The temperature of the radiator cooling fluid 1401 flowing into radiator inlet conduit 1450 is a temperature $T_{combined}$ which is a function of the temperature of the radiator cooling fluid 1401 flowing into junction from engine cooling circuit 1425 and from EGI circuit 1435 and the respective flow rates of radiator cooling fluid 1401 flowing through each of the foregoing circuits.

Figure 15:
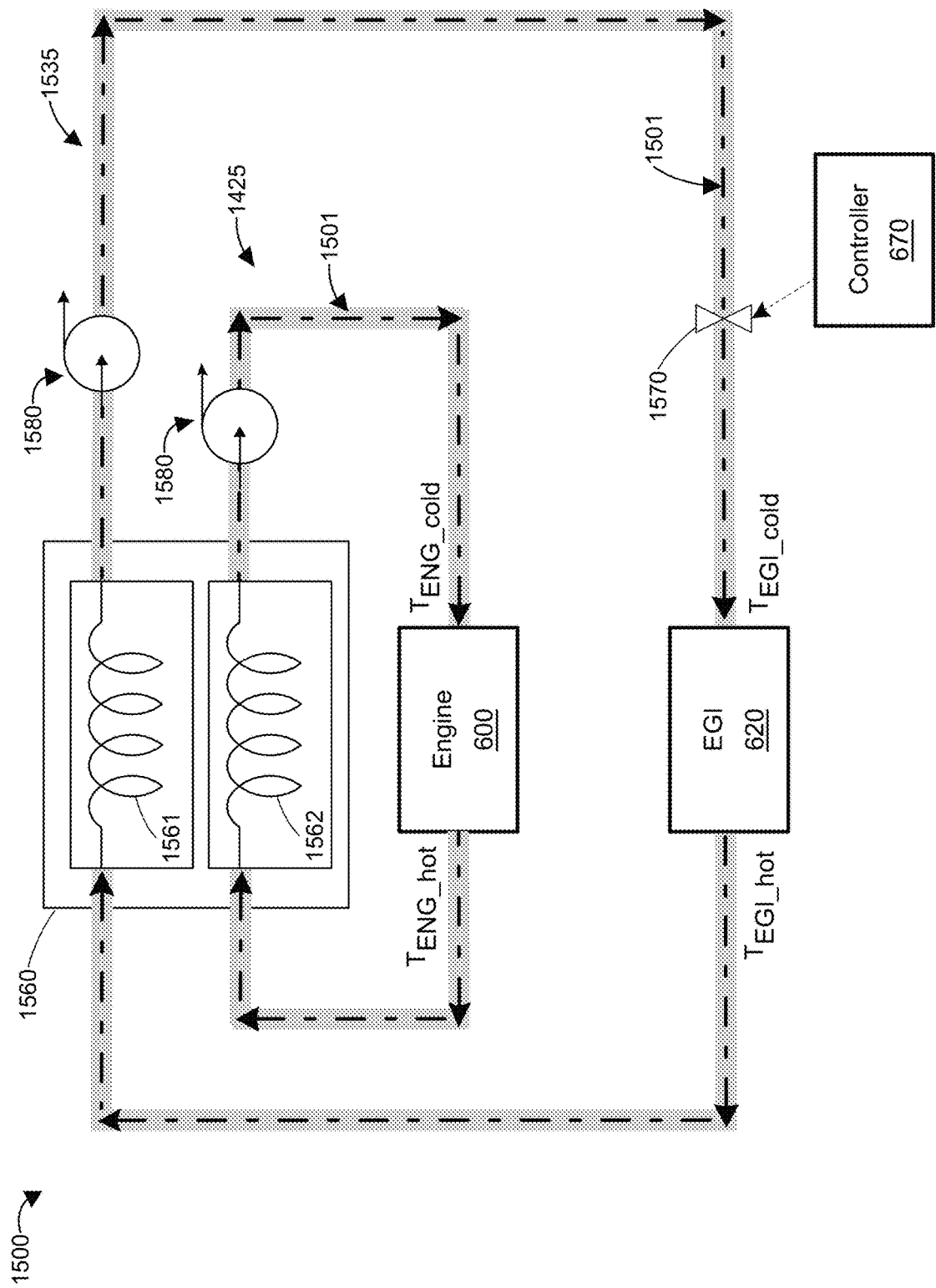
FIG. 15 illustrates an exemplary system including parallel radiator cooling fluid circuits for providing radiator cooling fluid to the engine and EGI according to one or more embodiments.

FIG. 15 illustrates an exemplary system 1500 including parallel radiator cooling fluid circuits for providing radiator cooling fluid 1501 to engine 600 and EGI 620 according to one or more embodiments. For example, exemplary system 1500 can be an alternative embodiment to exemplary system 1200. The parallel radiator cooling fluid circuits include an engine cooling circuit 1525 and an EGI circuit 1535. The engine cooling circuit 1525 provides radiator cooling fluid 1501 to cool engine 600. The radiator cooling fluid 1501 in engine cooling circuit 1525 passes through a first radiator coil 1561 in radiator 1560 to cool the radiator cooling fluid 1501 after it is heated by engine 600. The EGI circuit 1535 provides radiator cooling fluid 1501 to cool EGI 620. The radiator cooling fluid 1501 in EGI circuit 1535 passes through a second radiator coil 1562 in radiator 1560 to cool the radiator cooling fluid 1501 after it is heated by the exhaust gases in EGI 620. The radiator coils 1561, 1562 cool the radiator cooling fluid 1501 for example by passing a stream of air over the external surface of the radiator coils 1561, 1562. The stream of air can be generated by movement of a vehicle driven by engine 600 or by a fan or other device that circulates air while the engine 600 is stationary, for example in a CHP system.

A valve 1570 is disposed in EGI circuit 1535 upstream of the input to EGI 620. Controller 670 adjusts the operating position of valve 1570 to control the volume and/or flow rate of radiator cooling fluid 1501 that flows through EGI 620 in EGI circuit 1535. The volume and/or flow rate of radiator cooling fluid 1501 that flows through EGI 620 corresponds to the amount of exhaust gas thermal energy that can be removed by EGI 620, for example as discussed above with respect to FIGS. 12 and 14. A pump 1580 is in fluid communication with each of engine cooling circuit 1525 and an EGI circuit 1535 to circulate radiator cooling fluid 1501 in the respective fluid circuit. As discussed with respect to FIG. 12, EGI 620 can also include an optional bypass path and bypass valve for exhaust gas (e.g., as described above with respect to EGI 220). As such, controller 670 can control the temperature of the exhaust gas exiting EGI 620 by adjusting the operating position of valve 1570 (to control the volume/flow rate of radiator cooling fluid 1501 passing through EGI 620) and/or by adjusting the bypass valve (to control the relative amount of exhaust gas that is cooled and that bypasses EGI 620).

In operation, radiator cooling fluid 1501 passes through a radiator coil 661 in radiator 660, which cools the radiator cooling fluid 1501 from a high temperature $T_H$ to a low temperature $T_L$. The cooling of the radiator cooling fluid 1501 in radiator coil 661 can be enhanced by passing a stream of air across the external surface of radiator coil 661 to remove thermal energy therefrom.

The foregoing exemplary system 1500 including parallel radiator cooling fluid circuits can be incorporated in any of the exhaust aftertreatment systems described herein (e.g., as illustrated and described with respect to any of FIGS. 2, 3, 6-10, and 14).

Figure 16:
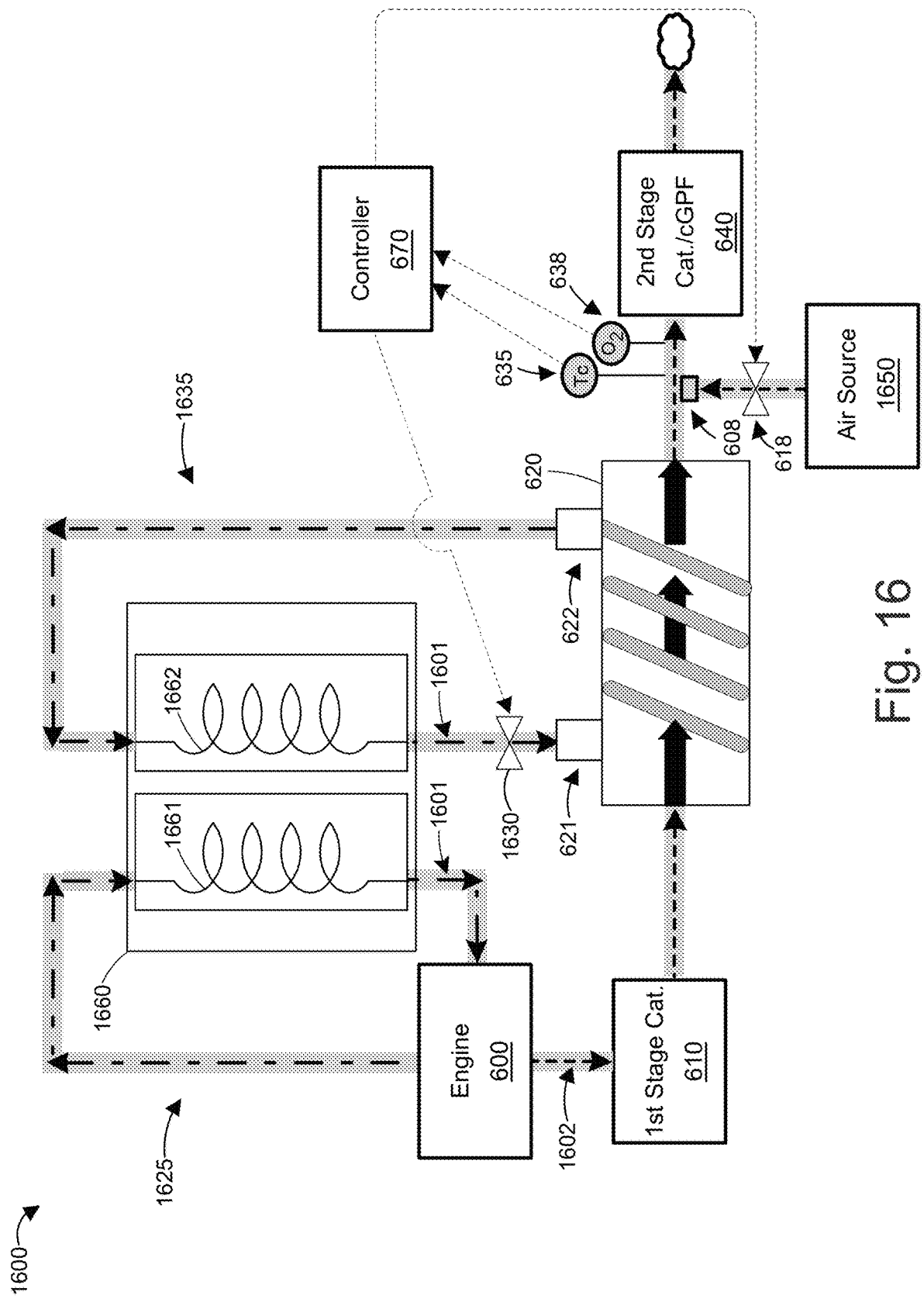
FIG. 16 illustrates an example of an exhaust aftertreatment system that includes parallel radiator cooling fluid circuits according to one or more embodiments.

FIG. 16 illustrates an example of an exhaust aftertreatment system 1600 that includes parallel radiator cooling fluid circuits according to one or more embodiments, where like reference numbers where to like elements. Similar to FIG. 15, radiator cooling fluid 1601 is cooled as it passes through radiator coils 1661, 1662 in radiator 1660. The radiator cooling fluid 1601 that flows through engine cooling circuit 1625 flows into channels defined in engine 600 to cool engine 600 as known in the art. The radiator cooling fluid 1601 that flows through EGI circuit 1635 flows into EGI 620 to cool exhaust gas passing therethrough. The operating position of valve 1630, adjustable by controller 670, determines the volume and/or flow rate of radiator cooling fluid 1601 that flows through EGI 620. The controller 670 can adjust the volume and/or flow rate of radiator cooling fluid 1601 that flows through EGI 620 in EGI circuit 1635 to control the temperature of exhaust gas entering second stage catalytic converter 640 (e.g., as measured by thermocouple 635), as discussed above.

As in FIG. 15, a pump (e.g., pump 1580) is in fluid communication with each of the engine cooling circuit 1625 and EGI circuit 1635, though such pumps are not illustrated in FIG. 16 for clarity only. In addition or in the alternative to adjusting operating position of valve 1630, controller 670 can control the pump (e.g., pump 1580) associated with EGI circuit 1635 to adjust the flow rate of radiator cooling fluid 1601 that flows through EGI 620 in EGI circuit 1635.

Figure 17:
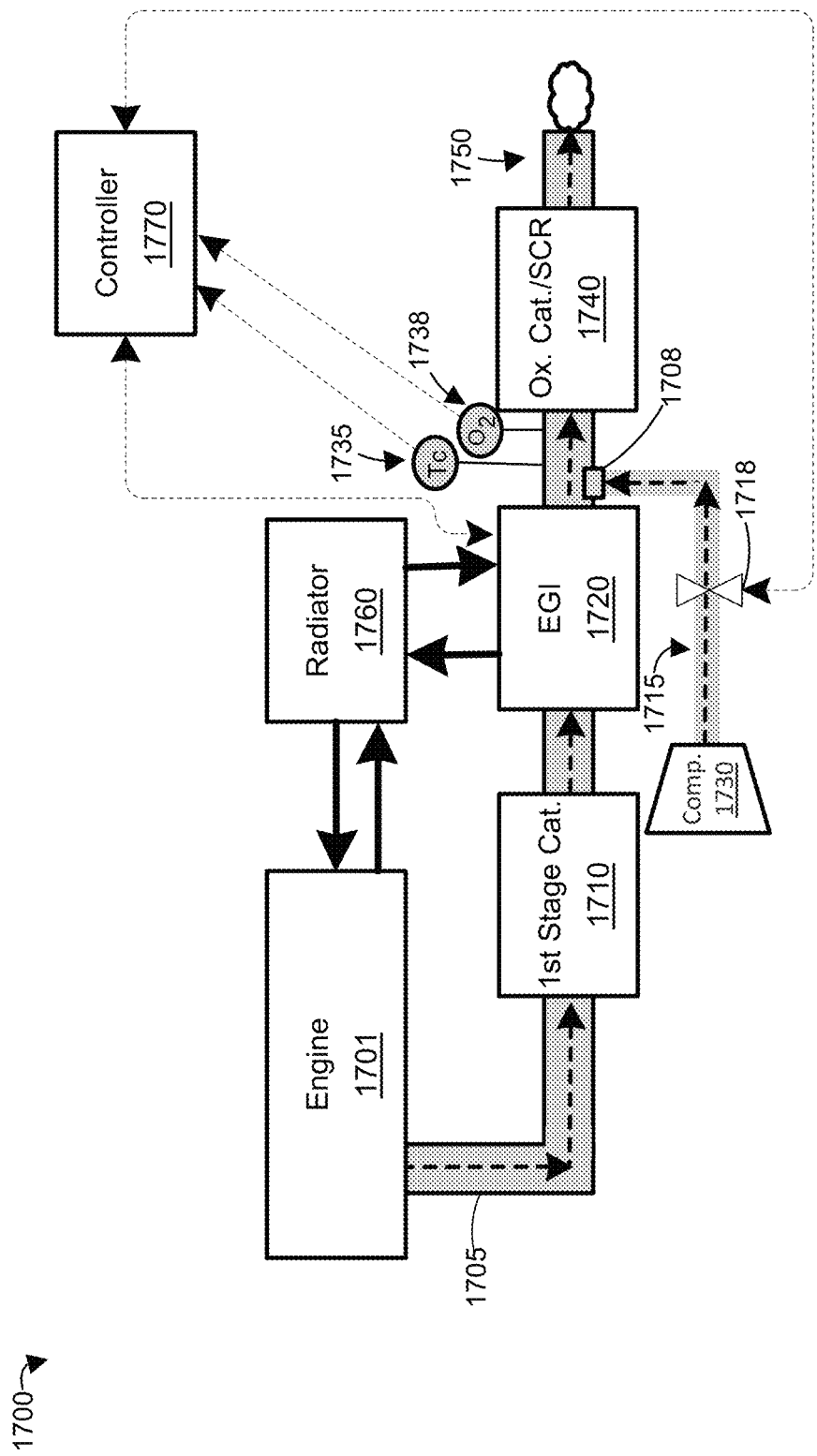
FIG. 17 is a block diagram of an exhaust aftertreatment system according to one or more embodiments.

FIG. 17 is a block diagram of an exhaust aftertreatment system 1700 according to one or more embodiments. The exhaust aftertreatment system 1700 includes a first stage catalytic converter 1710, an exhaust gas intercooler (EGI) 1720, an air compressor 1730, and an oxidation catalyst/SCR 1740. The first stage catalytic converter 1710 can be the same or substantially the same as first stage catalytic converter 210 described above. Thus, first stage catalytic converter 1710 can include a catalyst comprising one or more PGMs, such as Pt, Pd, and/or Rh. In some embodiments, the first stage catalytic converter 1710 includes a TWC. The first stage catalytic converter 1710 promotes chemical reactions (e.g., reduction reactions) that remove $NO_x$ compounds from the exhaust stream (e.g., by reducing $NO_x$ to form $N_2$ and $O_2$). The first stage catalytic converter 1710 can also promote chemical reactions that reduce the concentration of CO and $C_xH_y$ compounds from the exhaust stream.

After passing through the first stage catalytic converter 1710, the exhaust gas passes through the EGI 1720, which lowers the temperature of the exhaust to about 350° F. to about 500° F. including about 375° F., about 400° F., about 425° F., about 450° F., or about 475° F., or any range between any two of the foregoing values. The EGI 1720 can be a heat exchanger or other cooling device (e.g., as described herein), which receives radiator cooling fluid from radiator 1760. Examples of the fluid circuits through which the radiator cooling fluid can flow are illustrated in FIGS. 12 and 14-16. EGI 1720 cools the exhaust with radiator fluid received from radiator 1760, which also provides radiator fluid to cool engine 1701.

After the exhaust gas exits the EGI 1720, it passes through exhaust conduit 1705 to the oxidation catalyst/SCR 1740. The exhaust conduit 1705 includes an inlet port 1708 disposed between the EGI 1720 and the oxidation catalyst/SCR 1740. The inlet port 1708 fluidly couples an air injection conduit 1715 to exhaust conduit 1705. The air injection conduit 1715 extends to compressor 1730, which can be an engine charger compressor as discussed herein. In operation, a portion of compressed air generated by compressor 1730 flows through air injection conduit 1715 and can be ejected, depending on the setting of flow control valve 1718, into exhaust conduit 1705 through inlet port 1708. When compressed air is introduced into exhaust conduit 1705, the exhaust gas has an increased oxygen content before it passes through oxidation catalyst/SCR 1740 than it does when the exhaust gas enters first stage catalytic converter 1710. For example, the oxygen content of the exhaust gas can be increased to at least about 0.1% by volume, such as at least about 0.25% by volume, at least about 0.5% by volume, at least about 0.75% by volume, at least about 1% by volume, or a higher concentration.

A thermocouple 1735 and an oxygen sensor 1738 are preferably disposed between the inlet port 1708 of exhaust conduit 1705 and the oxidation catalyst/SCR 1740. The thermocouple 1735 measures the temperature of the exhaust and provides the measured temperature as an input to a microprocessor-based controller 1770 to control the exhaust temperature (e.g., as described above). The oxygen sensor 1738 measures the oxygen concentration in the exhaust and provides the measured oxygen concentration as an input to controller 1770 for the vehicle to control the oxygen concentration. To adjust the oxygen concentration, controller 1770 adjusts the operating position of flow control valve 1718 which is in electrical communication with controller 1770. Controller 1770 compares the measured oxygen content with a target oxygen concentration or target oxygen concentration range (e.g., as described above) and adjusts the operating position of flow control valve 1718 accordingly. Flow control valve 1718 can be a throttle valve, a butterfly valve, a ball valve, a check valve, a globe valve, a solenoid valve, or other valve.

The oxidation catalyst/SCR 1740 can include a catalyst comprising one or more PGMs, such as Pt, Pd, and/or Rh. In some embodiments, the oxidation catalyst/SCR 1740 includes a TWC. The oxidation catalyst/SCR 1740 also includes a storage catalyst that can store ammonia ($NH_3$) and/or $NO_x$ compounds. This oxidation/storage catalyst may include, but is not limited to, zeolite(s), vanadium, and/or titanium oxide carrier(s). Catalyst formulations that increase the storage capacity of ammonia should improve the performance of this technology.

When the engine 1701 accelerates, the air-fuel ratio (AFR) turns slightly rich (i.e., $\lambda<1$ such as 0.8-0.9, where 1 is a stoichiometric AFR), which causes ammonia to form in the first stage catalytic converter 1710, in general following the reaction $2NO+5H_2 \rightarrow 2NH_3+2H_2O$. Without being bound by any theory, it appears that at least some of this ammonia is then stored in the oxidation catalyst/SCR 1740 (e.g., in the storage catalyst), which operates at a relatively low temperature (about ambient (e.g., cold start) to about 500° F.) downstream of the EGI 1720. It is believed that the relatively low operating temperature of the oxidation catalyst 1740 promotes storage of ammonia, as discussed below.

When the engine 1701 decelerates, the AFR turns slightly lean (i.e., $\lambda>1$ such as 1.1), which promotes the formation of $NO_x$ compounds in the exhaust. Not all of the $NO_x$ compounds are reduced by the first stage catalytic converter 1710 and therefore at least some of the $NO_x$ compounds bypass the first stage catalytic converter 1710 and flow to the oxidation catalyst/SCR 1740. Without being bound by any theory, it appears that the bypassed $NO_x$ compounds react with the stored ammonia (stored during the rich-burn operation) in the oxidation catalyst/SCR 1740. It appears that the oxidation catalyst/SCR 1740 uses the stored ammonia as a reducing agent to react with the bypassed $NO_x$ compounds to form nitrogen and water, similar to typical SCR reactions. For example, the stored ammonia and the bypassed $NO_x$ compounds can react as follows:

(1)

(2)

Thus, it is believed that ammonia is stored in the oxidation catalyst/SCR 1740 (i.e., in the storage catalyst) when the engine 1701 operates in the rich-burn regime (i.e., during acceleration), and that stored ammonia is then used as a reducing agent to react with $NO_x$ compounds when the engine 1701 operates in the lean-burn regime (i.e., during deceleration). As such, the oxidation catalyst/SCR 1740 operates as a SCR with respect to the $NO_x$ and ammonia compounds. As can be seen, the reaction of ammonia and $NO_x$ compounds reduces the concentration of those chemicals in the exhaust downstream of the oxidation catalyst/SCR 1740 where it exits tailpipe 1750.

In addition, the ammonia produced in the first stage catalytic converter 1710 reacts in the oxidation catalyst/SCR 1740 to form nitrogen and water in the same manner as discussed above. This reaction of ammonia and $NO_x$ compounds also reduces the concentration of those chemicals in the exhaust downstream of the oxidation catalyst/SCR 1740 where it exits tailpipe 1750.

As can be seen, under either theory, the foregoing system 1700 reduces the concentration of ammonia and $NO_x$ compounds through the operation of engine 1701 in both the rich-burn and the lean-burn regimes, which occurs during normal use of a vehicle.

It is noted that any of the second stage catalytic converters or cGPFs described above can include the same catalysts (including the storage catalyst) as oxidation catalyst/SCR 1740, and thus can operate in the same or similar manner as exhaust aftertreatment system 1700 with respect to the storage and reaction of ammonia and $NO_x$ compounds. Specifically, second stage catalytic converter/cGPF 240, second stage catalytic converter 340, second stage catalytic converter/cGPF 640, and/or second stage catalytic converter 740 can include the same catalysts (including the storage catalyst) as oxidation catalyst/SCR 1740.

Figure 18:
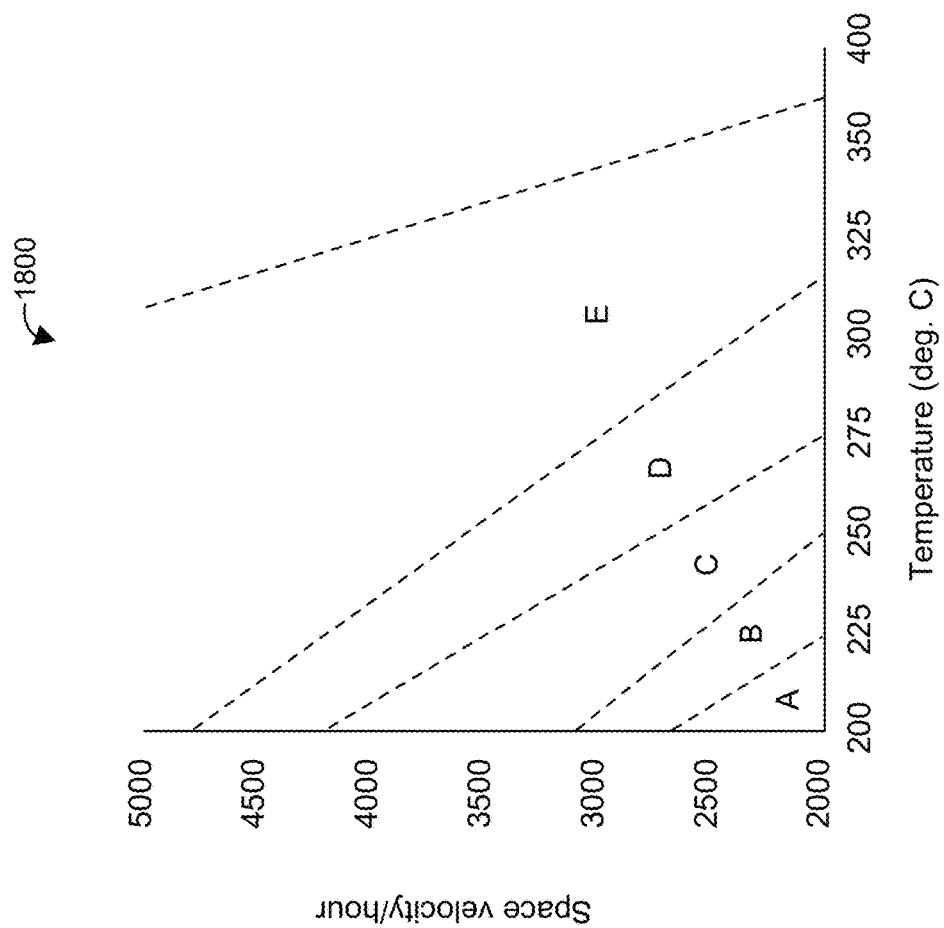
FIG. 18 is a contour map of the storage capacity for ammonia of the storage catalyst in the oxidation catalyst/SCR illustrated in FIG. 17 as a function of temperature and space velocity.

FIG. 18 is a contour map 1800 of the storage capacity for ammonia of the storage catalyst in oxidation catalyst/SCR 1740 as a function of temperature and space velocity (i.e., flow rate). In general, the ammonia storage capacity (storage/gram of storage catalyst) increases at lower temperatures and at lower space velocities. Thus, the ammonium storage capacity in region A is greater than the ammonium storage capacity in region B, which is greater than the ammonium storage capacity in region C, which is greater than the ammonium storage capacity in region D, which is greater than the ammonium storage capacity in region E. In some embodiments, the ammonia storage capacity in region A is about 14-16 g; the ammonia storage capacity in region B is about 10 g; the ammonia storage capacity in region C is about 6-8 g; the ammonia storage capacity in region D is about 4-6 g; and the ammonia storage capacity in region E is about 2-4 g. Additional details of ammonium storage capacity as a function of flow rate and temperature are disclosed in Y. Zhao et al, "Ammonia Storage and Slip in a Urea Selective Catalytic Reduction Catalyst under Steady and Transient Conditions," Ind. Eng. Chem. Res., 2011, 50 (21), pp. 11863-11871, which is hereby incorporated by reference.

As illustrated in contour map 1800, the storage catalyst has the highest ammonium storage capacity in region A, which has a temperature range of 200° C. to 225° C. and a space velocity of 2,000/h to 2,500/h. This temperature range overlaps with the operating temperature range of EGI 1720 of 350° F. to about 500° F. It is noted that the temperature ranges associated with regions B and C also overlap with the operating temperature range of EGI 1720.

Figure 19:
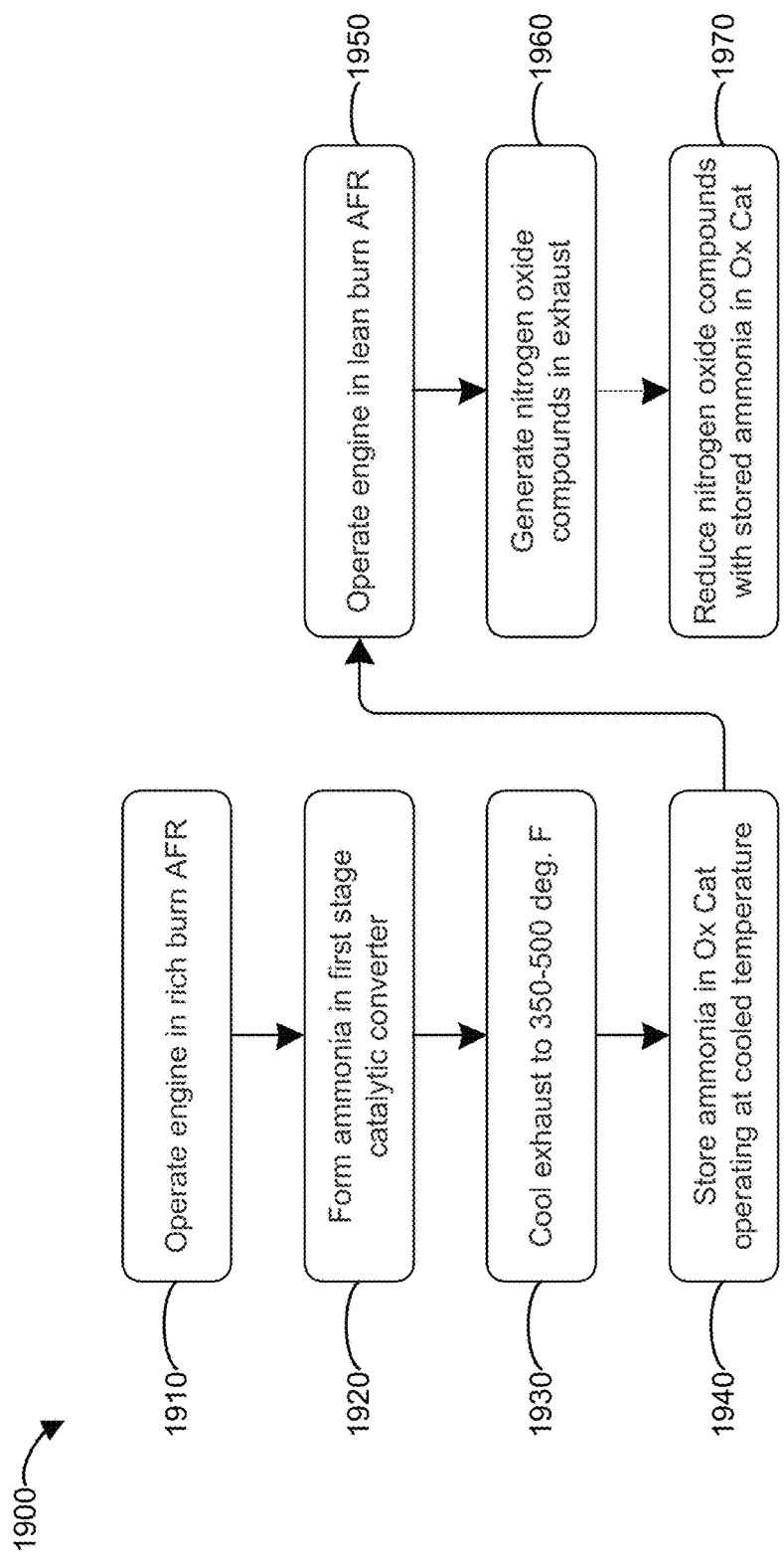
FIG. 19 is a flow chart of a method for reducing the concentration of ammonia and $NO_x$ compounds in the exhaust of a vehicle according to a first theory of operation.

FIG. 19 is a flow chart 1900 of a method for reducing the concentration of ammonia and $NO_x$ compounds in the exhaust of a vehicle according to a first theory of operation. Flow chart 1900 can be practiced with exhaust aftertreatment system 1700, or with any of the other systems described herein. In step 1910, the spark-ignited internal combustion engine operates in a rich burn AFR (i.e., $\lambda<1$ such as 0.8-0.9), such as during acceleration. In step 1920, the exhaust from the engine passes through a first stage catalytic converter, which forms ammonia as a byproduct of the chemical reactions therein. In step 1930, the exhaust, including the ammonia, flows through a cooling unit that reduces the temperature of the exhaust from about 1,200° F. down to about 350° F. to about 500° F., including about 375° F., about 400° F., about 425° F., about 450° F., or about 475° F., or any range between any two of the foregoing values. This cooled temperature allows the oxidation catalyst/SCR, fluidly coupled to the cooling unit, to store at least some of the ammonia generated by the first stage catalytic converter in a storage catalyst in step 1940.

In step 1950, the engine operates in a lean burn AFR (i.e., λ>1 such as 1.1), such as during deceleration. In step 1960, the engine generates additional nitrogen oxide compounds that cannot be fully treated by the first stage catalytic converter. Thus, at least some of the nitrogen oxide compounds "slip" past the first stage catalytic converter. In step 1970, the slipped nitrogen oxide compounds react with the ammonia stored in the storage catalyst of the oxidation catalyst/SCR, the stored ammonia operating as a reducing agent. As a result, the method provided in flow chart 1900 reduces the concentration of nitrogen oxide compounds and ammonia in the exhaust generated by an engine that runs in both the rich-burn regime (e.g., during acceleration) and the lean-burn regime (e.g., during deceleration).

Figure 20:
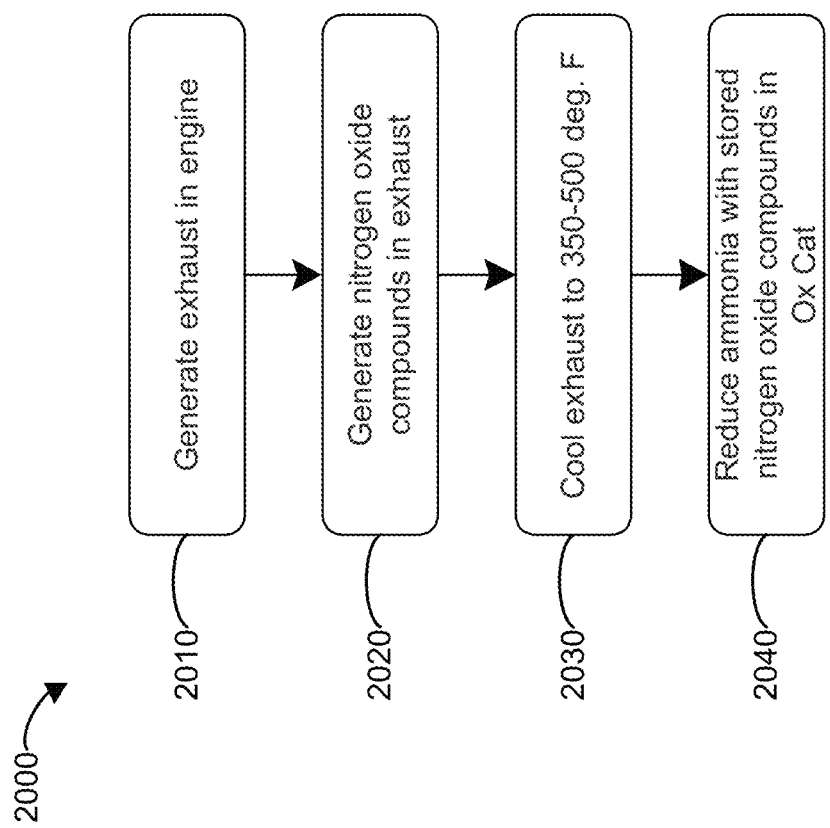
FIG. 20 is a flow chart of a method for reducing the concentration of ammonia and $NO_x$ compounds in the exhaust according to a second theory of operation.

FIG. 20 is a flow chart 2000 of a method for reducing the concentration of ammonia and $NO_x$ compounds in the exhaust according to a second theory of operation. Flow chart 2000 can be practiced with exhaust aftertreatment system 1700, or with any of the other systems described herein. In step 2010, exhaust is generated in the engine. In step 2020, the engine generates nitrogen oxide compounds and ammonia that cannot be fully treated by the first stage catalytic converter, and thus some of the nitrogen oxide compounds slip through the first stage catalytic converter. In step 2030, the exhaust, including the slipped nitrogen oxide compounds, flows through a cooling unit that reduces the temperature of the exhaust from about 1,200° F. down to about 350° F. to about 500° F., including about 375° F., about 400° F., about 425° F., about 450° F., or about 475° F., or any range between any two of the foregoing values. In step 2040, the generated ammonia reacts with the nitrogen oxide compounds in the oxidation catalyst/SCR, the ammonia operating as a reducing agent. As a result, the method provided in flow chart 2000 reduces the concentration of nitrogen oxide compounds and ammonia in the exhaust generated by an engine.

In the foregoing specification, the technology has been described with reference to specific embodiments. However, one of ordinary skill in the art appreciates that various modifications and changes can be made without departing from the scope of the disclosure and embodiments described herein. Accordingly, the specification and figures are to be regarded in an illustrative rather than a restrictive sense, and all such modifications are intended to be included within the scope of this disclosure.

What is claimed is:

1. A system comprising:
    a first catalytic converter including a three-way catalyst, the first catalytic converter receiving an exhaust generated by a spark-ignited internal combustion engine in a vehicle;
    an oxidation catalyst comprising an ammonia storage catalyst, the oxidation catalyst in fluid communication with an output of the first catalytic converter, the ammonia storage catalyst configured to store ammonia from the exhaust when the engine operates with a rich air-fuel ratio (AFR) so that the stored ammonia reacts with $NO_x$ compounds in the exhaust when the engine operates with a lean AFR;
    an exhaust conduit extending from the first catalytic converter to the oxidation catalyst;
    an air injector in fluid communication with the exhaust conduit; and
    an exhaust gas intercooler in thermal communication with the exhaust in the exhaust conduit, the exhaust gas intercooler configured to lower a temperature of the exhaust to be within a range of about 350° F. to about 500° F.

2. The system of claim 1, further comprising:
    a radiator;
    an EGI radiator cooling fluid circuit in thermal communication with said exhaust gas intercooler and said radiator; and
    an engine radiator cooling fluid circuit in thermal communication with said engine and said radiator, wherein said engine radiator cooling fluid circuit is fluidically in parallel with said EGI radiator cooling fluid circuit.

3. The system of claim 2, wherein said EGI radiator cooling fluid circuit and said engine radiator cooling fluid circuit share a common radiator cooling fluid path that extends through a common radiator coil in said radiator.

4. The system of claim 1, wherein said oxidation catalyst comprises at least one of the following: Pt, Ir, Rh, or Pd.

5. The system of claim 4, wherein said ammonia storage catalyst comprises at least one of a zeolite, vanadium or a titanium oxide carrier.

6. The system of claim 1, further comprising a gas particulate filter coupled to said exhaust conduit or said oxidation catalyst.

7. The system of claim 6, wherein said gas particulate filter and said oxidation catalyst are integrated as a catalyzed gas particulate filter.

8. The system of claim 1, wherein said air injector comprises an engine charger compressor.

9. The system of claim 8, further comprising:
    a compressed air conduit extending from said engine charger compressor to an intake of said engine; and
    an air ejection conduit extending from (a) said engine charger compressor or (b) said compressed air conduit to (c) said exhaust conduit, whereby said air ejection conduit introduces a stream of compressed air into said exhaust conduit.

10. The system of claim 9, further comprising an oxygen sensor disposed in said exhaust conduit between (a) an inlet port for said compressed air conduit and (b) said oxidation catalyst, the oxygen sensor outputting an oxygen content of said exhaust to a controller.

11. The system of claim 10, wherein said controller is configured to adjust said operating position of a flow control valve disposed in the air ejection conduit such that said oxygen content is at least about 0.1% by volume.

12. The apparatus of claim 1, wherein the exhaust gas intercooler is configured to lower the temperature of the exhaust to about 400° F.

13. A method for reducing emissions from a spark-ignited internal combustion engine, the method comprising:
    when said engine operates with a rich air-fuel ratio (AFR):
        passing a rich exhaust generated by said engine with said rich AFR through a first stage catalytic converter;
        with said rich exhaust, generating ammonia in the first stage catalytic converter;

cooling the rich exhaust, including the ammonia, in an exhaust gas intercooler to be within a range of about 350° F. to about 500° F. to form cooled rich exhaust;

passing the cooled rich exhaust through an oxidation catalyst comprising an ammonia storage catalyst, the ammonia storage catalyst configured to store at ammonia; and storing at least some of the ammonia in the ammonia storage catalyst;

when said engine operates with a lean AFR:

passing a lean exhaust generated by said engine with said lean AFR through said first stage catalytic converter;

cooling the lean exhaust in said exhaust gas intercooler to about 350° F. to about 500° F. to form a cooled lean exhaust;

passing the cooled lean exhaust through the oxidation catalyst; and reacting nitrogen oxide compounds in the cooled lean exhaust with the ammonia stored in the ammonia storage catalyst, thereby reducing a concentration of the ammonia and nitrogen oxide compounds in the rich and lean exhausts.

14. The method of claim 13, further comprising: when said engine operates with said rich AFR, reacting at least some of the ammonia with the nitrogen oxide compounds, slipped by the first stage catalyst, in the second stage catalyst with air injection.

15. The method of claim 14, further comprising increasing an oxygen content of the cooled rich exhaust to at least about 0.1% by volume.

16. The method of claim 14, wherein the rich and lean exhausts are cooled to about 400° F.

* * * * *